US012652706B2

(12) United States Patent
Lanante et al.

(10) Patent No.: US 12,652,706 B2
(45) Date of Patent: Jun. 9, 2026

(54) ENHANCED MULTI-LINK UORA

(71) Applicant: Ofinno, LLC, Reston, VA (US)

(72) Inventors: Leonardo Alisasis Lanante, Reston, VA (US); Kiseon Ryu, McLean, VA (US); Esmael Hejazi Dinan, McLean, VA (US); Jeongki Kim, Seoul (KR)

(73) Assignee: Ofinno, LLC, Reston, VA (US)

( * ) Notice: Subject to any disclaimer, the term of this patent is extended or adjusted under 35 U.S.C. 154(b) by 521 days.

(21) Appl. No.: 18/114,369

(22) Filed: Feb. 27, 2023

(65) Prior Publication Data

US 2023/0284290 A1 Sep. 7, 2023

Related U.S. Application Data

(60) Provisional application No. 63/315,117, filed on Mar. 1, 2022.

(51) Int. Cl.
*H04W 74/0833* (2024.01)
*H04W 74/04* (2009.01)

(52) U.S. Cl.
CPC ......... *H04W 74/085* (2013.01); *H04W 74/04* (2013.01)

(58) Field of Classification Search
CPC ............... H04W 74/006; H04W 74/04; H04W 74/0841; H04W 74/085
See application file for complete search history.

(56) References Cited

U.S. PATENT DOCUMENTS

| | | | |
|---|---|---|---|
| 9,668,243 B1 * | 5/2017 | Gong ................ | H04W 74/0825 |
| 10,405,311 B2 | 9/2019 | Ghosh et al. | |
| 10,856,212 B2 | 12/2020 | Viger et al. | |
| 2018/0110076 A1 * | 4/2018 | Ko ........................ | H04L 1/1614 |
| 2020/0029376 A1 * | 1/2020 | Asterjadhi ............ | H04W 28/04 |
| 2021/0329500 A1 * | 10/2021 | Cariou .................. | H04W 28/24 |
| 2021/0329637 A1 * | 10/2021 | Chen ................ | H04W 72/0453 |
| 2021/0337564 A1 * | 10/2021 | Kwon ............... | H04W 72/0446 |
| 2022/0110123 A1 | 4/2022 | Adachi et al. | |
| 2022/0123913 A1 | 4/2022 | Azizi et al. | |
| 2022/0159106 A1 | 5/2022 | Kim et al. | |
| 2022/0286228 A1 * | 9/2022 | Song ..................... | H04L 1/1812 |
| 2023/0011167 A1 * | 1/2023 | Chitrakar .......... | H04W 74/0816 |

* cited by examiner

*Primary Examiner* — Kashif Siddiqui

(74) *Attorney, Agent, or Firm* — Yasser Mourtada; Kavon Nasabzadeh; James Bender

(57) ABSTRACT

A station (STA) multi-link device (MLD) receives from an access point (AP) MLD, over a plurality of links, a plurality of trigger frames each indicating at least one random access resource unit (RA-RU). The STA MLD reduces a backoff counter in response to receiving each of the plurality of trigger frames, where the backoff counter is reduced in response to receiving a trigger frame based on a number of RA-RUs indicated in the trigger frame. Based on the backoff counter reaching zero, the STA MLD transmits to the AP MLD, on a link of the plurality links, a physical layer protocol data unit (PPDU) via one of the RA-RUs indicated in the plurality of trigger frames.

20 Claims, 25 Drawing Sheets

2300

1800

2300

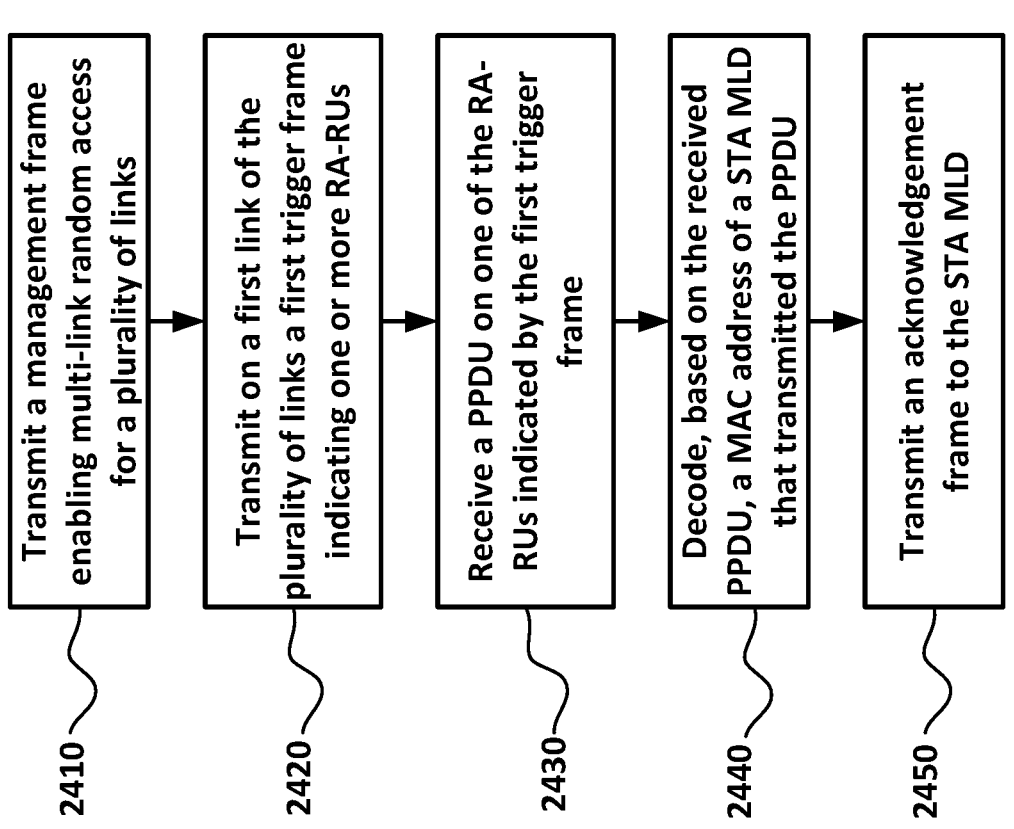

2400

Transmit a management frame enabling multi-link random access for a plurality of links — 2410

Transmit on a first link of the plurality of links a first trigger frame indicating one or more RA-RUs — 2420

Receive a PPDU on one of the RA-RUs indicated by the first trigger frame — 2430

Decode, based on the received PPDU, a MAC address of a STA MLD that transmitted the PPDU — 2440

Transmit an acknowledgement frame to the STA MLD — 2450

FIG. 24

Processor
2504

Main Memory
2506

Communication
Infrastructure
2502

Secondary Memory
2508

Hard Disk Drive
2510

Removable
Storage Drive
2512

Removable
Storage Unit
2516

Interface
2514

Removable
Storage Unit
2518

Communication
Interface
2520

Communication Path
2522

2500

ENHANCED MULTI-LINK UORA

CROSS-REFERENCE TO RELATED APPLICATIONS

This application claims the benefit of U.S. Provisional Application No. 63/315,117, filed Mar. 1, 2022, which is hereby incorporated by reference in its entirety.

BRIEF DESCRIPTION OF THE DRAWINGS

Examples of several of the various embodiments of the present disclosure are described herein with reference to the drawings.

FIG. 24 illustrates another example process according to an embodiment of the present disclosure.

DETAILED DESCRIPTION

Figure 1:
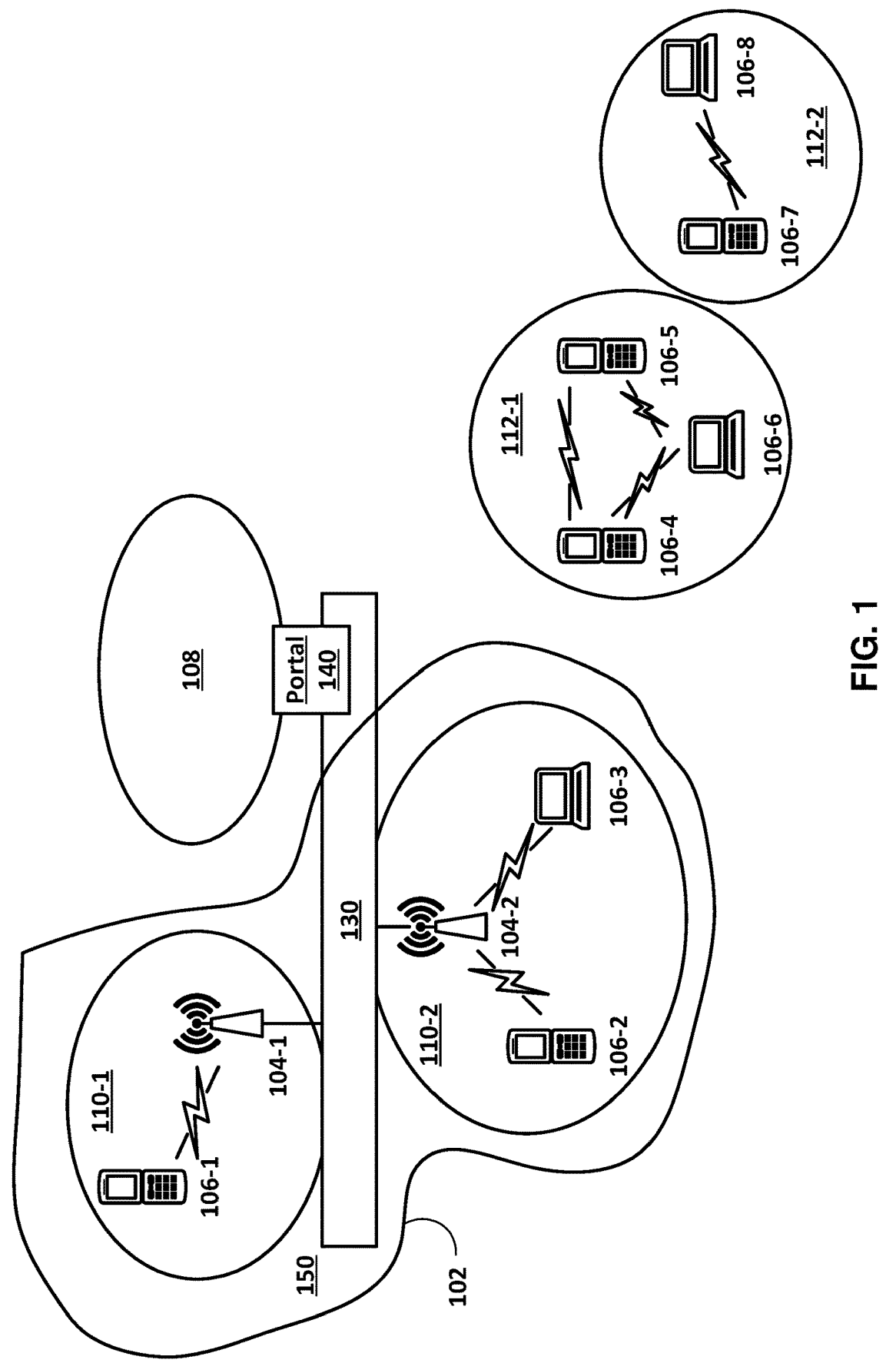
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PLCP service data unit (PSDU). For example, the PSDU may include a PHY Convergence Protocol (PLCP) preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHz, 5 GHz, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 520 MHz by bonding together multiple 20 MHz channels.

Figure 2:
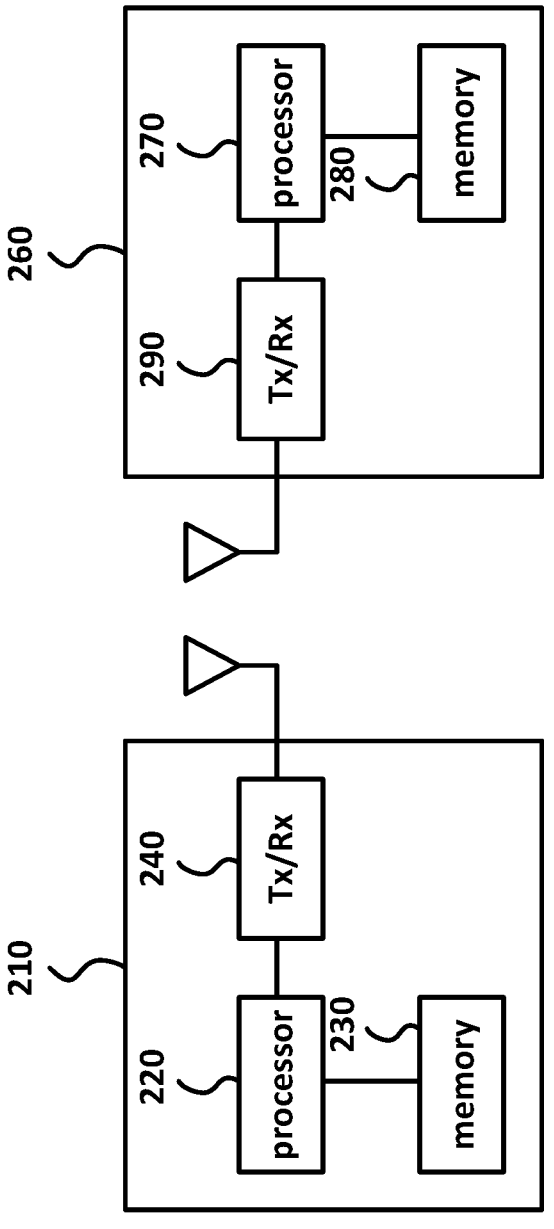
FIG. 2 is a block diagram illustrating example implementations of a station (STA) and an access point (AP).

FIG. 2 is a block diagram illustrating example implementations of a STA 210 and an AP 260.

As shown in FIG. 2, STA 210 may include at least one processor 220, a memory 230, and at least one transceiver 240. AP 260 may include at least one processor 270, memory 280, and at least one transceiver 290. Processor 220/270 may be operatively connected to transceiver 240/290.

Transceiver 240/290 may be configured to transmit/receive radio signals. In an embodiment, transceiver 240/290 may implement a PHY layer of the corresponding device (STA 210 or AP 260).

In an embodiment, STA 210 and/or AP 260 may be a multi-link device (MLD), that is a device capable of operating over multiple links as defined by the IEEE 802.11be standard amendment. As such, STA 210 and/or AP 260 may each have multiple PHY layers. The multiple PHY layers may be implemented using one or more of transceivers 240/290.

Processor 220/270 may implement functions of the PHY layer, the MAC layer, and/or the logical link control (LLC) layer of the corresponding device (STA 210 or AP 260).

Processor 220/270 and/or transceiver 240/290 may include application specific integrated circuit (ASIC), other chipset, logic circuit and/or data processor. Memory 230/280 may include read-only memory (ROM), random access memory (RAM), flash memory, memory card, storage medium and/or other storage unit.

When the embodiments are executed by software, the techniques (or methods) described herein can be executed with modules (e.g., processes, functions, and so on) that perform the functions described herein. The modules can be stored in memory 230/280 and executed by processor 220/270. Memory 230/280 may be implemented (or positioned) within processor 220/270 or external to processor 220/270. Memory 230/280 may be operatively connected to processor 220/270 via various means known in the art.

Figure 3:
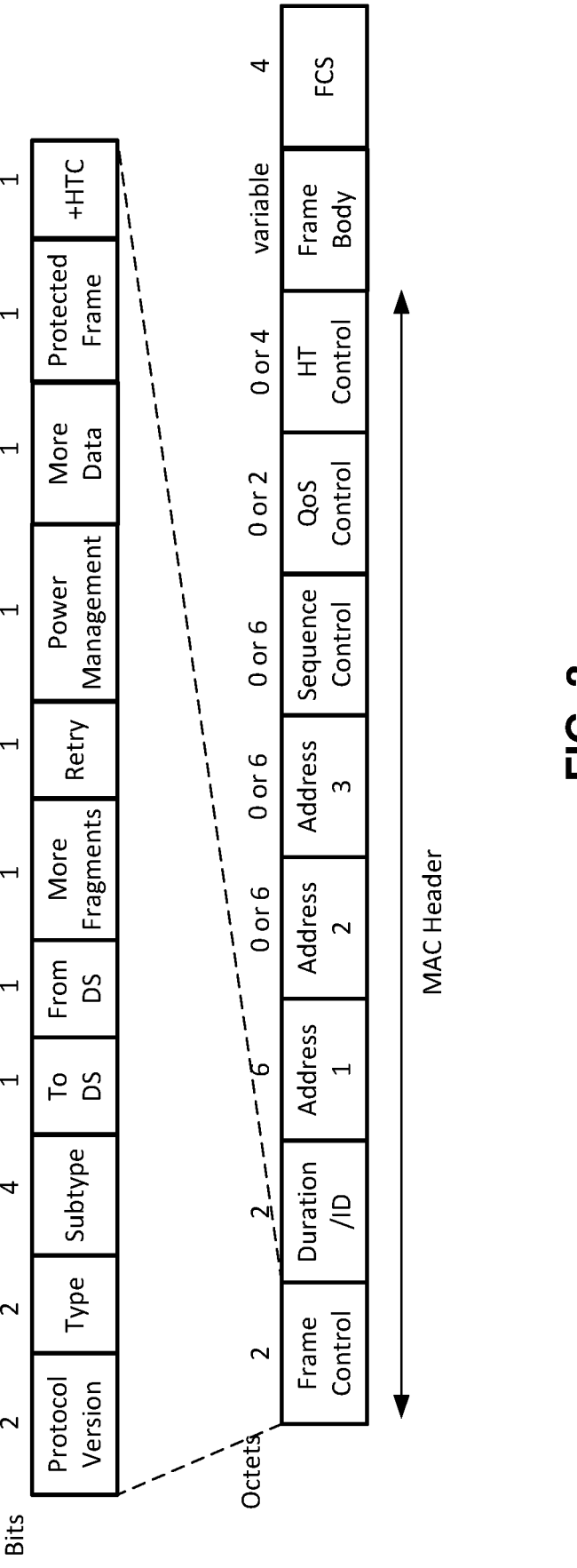
FIG. 3 illustrates an example of a Medium Access Control (MAC) frame format.

FIG. 3 illustrates an example format of a MAC frame. In operation, a STA may construct a subset of MAC frames for transmission and may decode a subset of received MAC frames upon validation. The particular subsets of frames that a STA may construct and/or decode may be determined by the functions supported by the STA. A STA may validate a received MAC frame using the frame check sequence (FCS) contained in the frame and may interpret certain fields from the MAC headers of all frames.

As shown in FIG. 3, a MAC frame includes a MAC header, a variable length frame body, and a frame check sequence (FCS).

The MAC header includes a frame control field, an optional duration/ID field, address fields, an optional sequence control field, an optional Quality of Service (QoS) control field, and an optional HT control field.

The frame control field includes the following subfields: protocol version, type, subtype, "To DS", "From DS", "More Fragments", retry, power management, "More Data, protected frame, and +HTC.

The protocol version subfield is invariant in size and placement across all revisions of the IEEE 802.11 standard. The value of the protocol version subfield is 0 for MAC frames.

The type and subtype subfields together identify the function of the MAC frame. There are three frame types: control, data, and management. Each of the frame types has several defined subtypes. Bits within the subtype subfield are used to indicate a specific modification of the basic data frame (subtype 0). For example, in data frames, the most significant bit (MSB) of the subtype subfield, bit 7 (B7) of the frame control field, is defined as the QoS subfield. When the QoS subfield is set to 1, it indicates a QoS data frame, which is a data frame that contains a QoS control field in its MAC header. The second MSB of the subtype field, bit 6 (B6) of the frame control field, when set to 1 in data subtypes, indicates a data frame that contain no frame body field.

The "To DS" subfield indicates whether a data frame is destined to the distribution system (DS). The "From DS" subfield indicates whether a data frame originates from the DS.

The "More Fragments" subfield is set to 1 in all data or management frames that have another fragment to follow the MAC service data unit (MSDU) or MAC management protocol data unit (MMPDU) carried by the MAC frame. The "More Fragments" subfield is set to 0 in all other frames in which the "More Fragments" subfield is present.

The retry subfield is set to 1 in any data or management frame that is a retransmission of an earlier frame. It is set to 0 in all other frames in which the retry subfield is present. A receiving STA uses this indication to aid it in the process of eliminating duplicate frames. These rules do not apply for frames sent by a STA under a block agreement.

The power management subfield is used to indicate the power management mode of a STA.

The "More Data" subfield indicates to a STA in power save (PS) mode that bufferable units (BUs) are buffered for that STA at the AP. The "More Data" subfield is valid in individually addressed data or management frames transmitted by an AP to a STA in PS mode. The "More Data" subfield is set to 1 to indicate that at least one additional buffered BU is present for the STA.

The protected frame subfield is set to 1 if the frame body field contains information that has been processed by a cryptographic encapsulation algorithm.

The +HTC subfield indicates that the MAC frame contains an HT control field.

The duration/ID field of the MAC header indicates various contents depending on the frame type and subtype and the QoS capabilities of the sending STA. For example, in control frames of the power save poll (PS-Poll) subtype, the duration/ID field carries an association identifier (AID) of the STA that transmitted the frame in the 14 least significant bits (LSB), with the 2 most significant bits (MSB) set to 1. In other frames sent by STAs, the duration/ID field contains a duration value (in microseconds) which is used by a recipient to update a network allocation vector (NAV). The NAV is a counter that indicates to a STA an amount of time during which the STA must defer from accessing the shared medium.

Up to four address fields may be present in the MAC frame format. The address fields are used to indicate the basic service set identifier (BSSID), source address (SA), destination address (DA), transmitting address (TA), and receiving address (RA). Certain frames may not contain some of the address fields. Certain address field usage may be specified by the relative position of the address field (1-4) within the MAC header, independent of the type of address present in that field. Specifically, the address 1 field always identifies the intended receiver(s) of the frame, and the address 2 field, where present, always identifies the transmitter of the frame.

The sequence control field includes two subfields, a sequence number subfield and a fragment number subfield. The sequence number subfield in data frames indicates the sequence number of the MSDU (if not in an Aggregated MSDU (A-MSDU)) or A-MSDU. The sequence number subfield in management frames indicates the sequence number of the frame. The fragment number subfield indicates the number of each fragment of an MSDU or MMPDU. The fragment number is set to 0 in the first or only fragment of an MSDU or MMPDU and is incremented by one for each successive fragment of that MSDU or MMPDU. The fragment number is set to 0 in a MAC protocol data unit (MPDU) containing an A-MSDU, or in an MPDU containing an MSDU or MMPDU that is not fragmented. The fragment number remains constant in all retransmissions of the fragment.

The QoS control field identifies the traffic category (TC) or traffic stream (TS) to which the MAC frame belongs. The QoS control field may also indicate various other QoS related, A-MSDU related, and mesh-related information about the frame. This information can vary by frame type, frame subtype, and type of transmitting STA. The QoS control field is present in all data frames in which the QoS subfield of the subtype subfield is equal to 1.

The HT control field is present in QoS data, QoS null, and management frames as determined by the +HTC subfield of the frame control field.

The frame body field is a variable length field that contains information specific to individual frame types and subtypes. The frame body may include one or more MSDUs or MMPDUs. The minimum length of the frame body is 0 octets.

The FCS field contains a 32-bit Cyclic Redundancy Check (CRC) code. The FCS field value is calculated over all of the fields of the MAC header and the frame body field.

Figure 4:
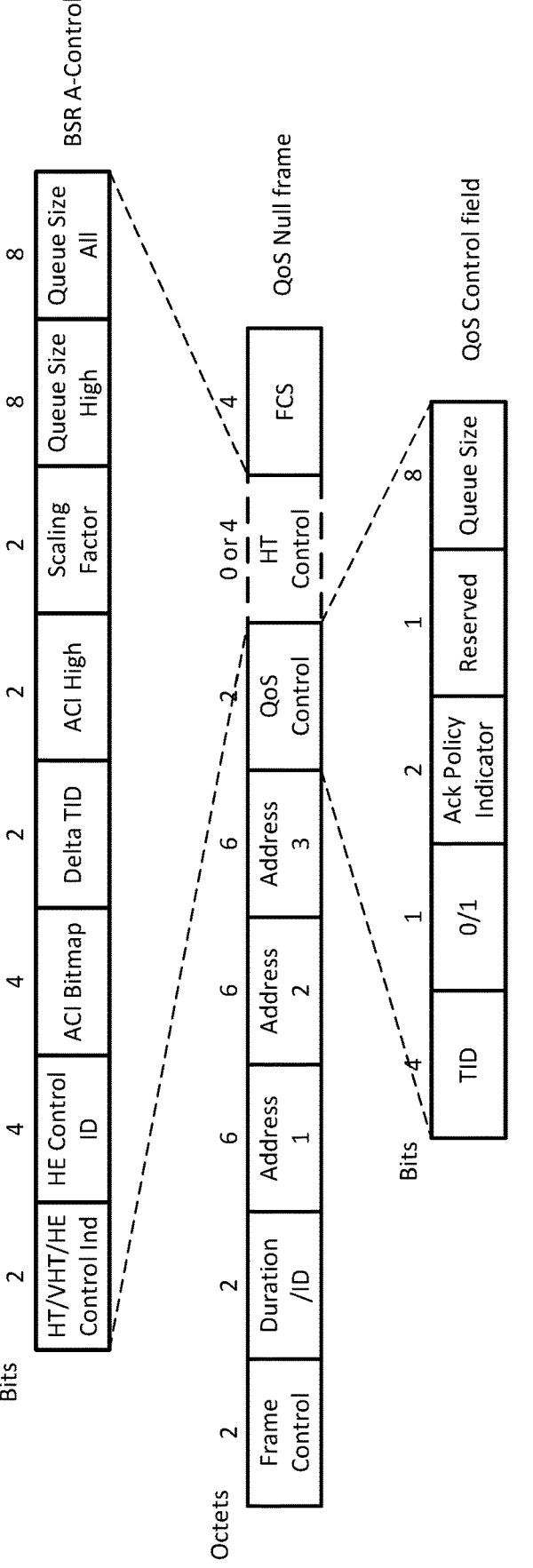
FIG. 4 illustrates an example of a Quality of Service (QoS) null frame indicating buffer status information.

FIG. 4 illustrates an example of a QoS null frame indicating buffer status information. A QoS null frame refers to a QoS data frame with an empty frame body. A QoS null frame includes a QoS control field and an optional HT control field which may contain a buffer status report (BSR) control subfield. A QoS null frame indicating buffer status information may be transmitted by a STA to an AP.

The QoS control field may include a traffic identifier (TID) subfield, an ack policy indicator subfield, and a queue size subfield (or a transmission opportunity (TXOP) duration requested subfield).

The TID subfield identifies the TC or TS of traffic for which a TXOP is being requested, through the setting of the TXOP duration requested or queue size subfield. The encoding of the TID subfield depends on the access policy (e.g., Allowed value 0 to 7 for enhanced distributed channel access (EDCA) access policy to identify user priority for either TC or TS).

The ack policy indicator subfield, together with other information, identifies the acknowledgment policy followed upon delivery of the MPDU (e.g., normal ack, implicit block ack request, no ack, block ack, etc.)

The queue size subfield is an 8-bit field that indicates the amount of buffered traffic for a given TC or TS at the STA for transmission to the AP identified by the receiver address of the frame containing the subfield. The queue size subfield is present in QoS null frames sent by a STA when bit 4 of the QoS control field is set to 1. The AP may use information contained in the queue size subfield to determine t TXOP duration assigned to the STA or to determine the uplink (UL) resources assigned to the STA.

In a frame sent by or to a non-High Efficiency (non-HE) STA, the following rules may apply to the queue size value:

The queue size value is the approximate total size, rounded up to the nearest multiple of 256 octets and expressed in units of 256 octets, of all MSDUs and A-MSDUs buffered at the STA (excluding the MSDU or A-MSDU contained in the present QoS Data frame) in the delivery queue used for MSDUs and A-MSDUs with TID values equal to the value indicated in the TID subfield of the QoS Control field.

A queue size value of 0 is used solely to indicate the absence of any buffered traffic in the queue used for the specified TID.

A queue size value of 254 is used for all sizes greater than 64 768 octets.

A queue size value of 255 is used to indicate an unspecified or unknown size.

In a frame sent by an HE STA to an HE AP, the following rules may apply to the queue size value.

The queue size value, QS, is the approximate total size in octets, of all MSDUs and A-MSDUs buffered at the STA (including the MSDUs or A-MSDUs contained in the same PSDU as the frame containing the queue size subfield) in the delivery queue used for MSDUs and A-MSDUs with TID values equal to the value indicated in the TID subfield of the QoS control field.

The queue size subfield includes a scaling factor subfield in bits B14-B15 of the QoS control field and an unscaled value, UV, in bits B8-B13 of the QoS control field. The scaling factor subfield provides the scaling factor, SF.

A STA obtains the queue size, QS, from a received QoS control field, which contains a scaling factor, SF, and an unscaled value, UV, as follows:

QS=

16×UV, if SF is equal to 0;

1024+256×UV, if SF is equal to 1;

17 408+2048×UV, if SF is equal to 2;

148 480+32 768×UV, if SF is equal to 3 and UV is less than 62;

>2 147 328, if SF equal to is 3 and UV is equal to 62;

Unspecified or Unknown, if SF is equal to 3 and UV is equal to 63.

The TXOP duration requested subfield, which may be included instead of the queue size subfield, indicates the duration, in units of 32 microseconds (us), that the sending STA determines it needs for its next TXOP for the specified TID. The TXOP duration requested subfield is set to 0 to indicate that no TXOP is requested for the specified TID in the current service period (SP). The TXOP duration requested subfield is set to a nonzero value to indicate a requested TXOP duration in the range of 32 us to 8160 us in increments of 32 us.

The HT control field may include a BSR control subfield which may contain buffer status information used for UL MU operation. The BSR control subfield may be formed from an access category index (ACI) bitmap subfield, a delta TID subfield, an ACI high subfield, a scaling factor subfield, a queue size high subfield, and a queue size all subfield of the HT control field.

The ACI bitmap subfield indicates the access categories for which buffer status is reported (e.g., B0: best effort (AC_BE), B1: background (AC_BK), B2: video (AC_VI), B3: voice (AC_VO), etc.). Each bit of the ACI bitmap subfield is set to 1 to indicate that the buffer status of the corresponding AC is included in the queue size all subfield, and set to 0 otherwise, except that if the ACI bitmap subfield is 0 and the delta TID subfield is 3, then the buffer status of all 8 TIDs is included.

The delta TID subfield, together with the values of the ACI bitmap subfield, indicate the number of TIDs for which the STA is reporting the buffer status.

The ACI high subfield indicates the ACI of the AC for which the BSR is indicated in the queue size high subfield. The ACI to AC mapping is defined as ACI value 0 mapping to AC_BE, ACI value 1 mapping to AC_BK, ACI value 2 mapping to AC_VI, and ACI value 3 mapping to AC_VO.

The scaling factor subfield indicates the unit SF, in octets, of the queue size high and queue size all subfields.

The queue size high subfield indicates the amount of buffered traffic, in units of SF octets, for the AC identified by the ACI high subfield, that is intended for the STA identified by the receiver address of the frame containing the BSR control subfield.

The queue size all subfield indicates the amount of buffered traffic, in units of SF octets, for all Acs identified by the ACI Bitmap subfield, that is intended for the STA identified by the receiver address of the frame containing the BSR control subfield.

The queue size values in the queue size high and queue size all subfields are the total sizes, rounded up to the nearest multiple of SF octets, of all MSDUs and A-MSDUs buffered at the STA (including the MSDUs or A-MSDUs contained in the same PSDU as the frame containing the BSR control subfield) in delivery queues used for MSDUs and A-MSDUs associated with AC(s) that are specified in the ACI high and ACI bitmap subfields, respectively.

A queue size value of 254 in the queue size high and queue size all subfields indicates that the amount of buffered traffic is greater than 254×SF octets. A queue size value of 255 in the queue size high and queue size all subfields indicates that the amount of buffered traffic is an unspecified or unknown size. The queue size value of QoS data frames containing fragments may remain constant even if the amount of queued traffic changes as successive fragments are transmitted.

MAC service provides peer entities with the ability to exchange MSDUs. To support this service, a local MAC uses the underlying PHY-level service to transport the MSDUs to a peer MAC entity. Such asynchronous MSDU transport is performed on a connectionless basis.

Figure 5:
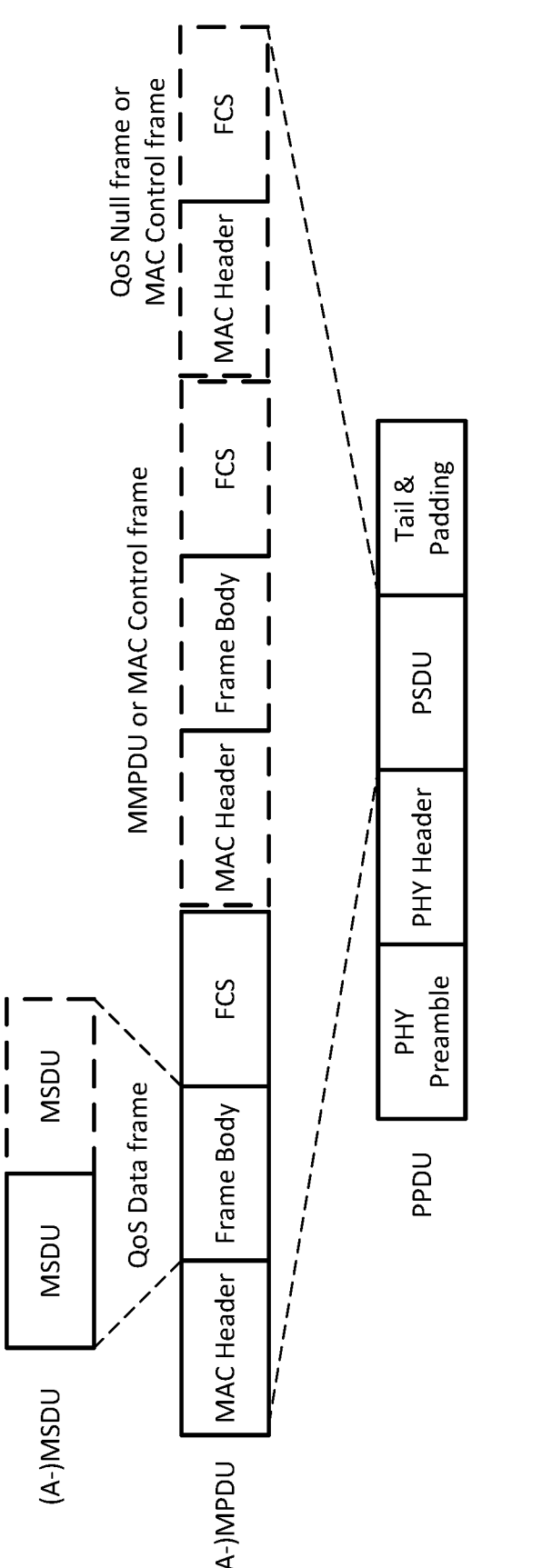
FIG. 5 illustrates an example format of a physical layer (PHY) protocol data unit (PPDU).

FIG. 5 illustrates an example format of a PPDU. As shown, the PPDU may include a PHY preamble, a PHY header, a PSDU, and tail and padding bits.

The PSDU may include one or more MPDUs, such as a QoS data frame, an MMPDU, a MAC control frame, or a QoS null frame. In the case of an MPDU carrying a QoS data frame, the frame body of the MPDU may include a MSDU or an A-MSDU.

By default, MSDU transport is on a best-effort basis. That is, there is no guarantee that a transmitted MSDU will be delivered successfully. However, the QoS facility uses a TID to specify differentiated services on a per-MSDU basis.

A STA may differentiate MSDU delivery according to designated traffic category (TC) or traffic stream (TS) of individual MSDUs. The MAC sublayer entities determine a user priority (UP) for an MSDU based on a TID value provided with the MSDU. The QoS facility supports eight UP values. The UP values range from 0 to 7 and form an ordered sequence of priorities, with 1 being the lowest value, 7 the highest value, and 0 falling between 2 and 3.

An MSDU with a particular UP is said to belong to a traffic category with that UP. The UP may be provided with each MSDU at the medium access control service access point (MAC SAP) directly in a UP parameter. An A-MPDU may include MPDUs with different TID values.

A STA may deliver buffer status reports (BSRs) to assist an AP in allocating UL MU resources. The STA may either implicitly deliver BSRs in the QoS control field or BSR control subfield of any frame transmitted to the AP (unsolicited BSR) or explicitly deliver BSRs in a frame sent to the AP in response to a BSRP Trigger frame (solicited BSR).

The buffer status reported in the QoS control field includes a queue size value for a given TID. The buffer status reported in the BSR control field includes an ACI bitmap, delta TID, a high priority AC, and two queue sizes.

A STA may report buffer status to the AP, in the QoS control field, of transmitted QoS null frames and QoS data frames and, in the BSR control subfield (if present), of transmitted QoS null frames, QoS data frames, and management frames as defined below.

The STA may report the queue size for a given TID in the queue size subfield of the QoS control field of transmitted QoS data frames or QoS null frames; the STA may set the queue size subfield to 255 to indicate an unknown/unspecified queue size for that TID. The STA may aggregate multiple QoS data frames or QoS null frames in an A-MPDU to report the queue size for different TIDs.

The STA may report buffer status in the BSR control subfield of transmitted frames if the AP has indicated its support for receiving the BSR control subfield.

A High-Efficiency (HE) STA may report the queue size for a preferred AC, indicated by the ACI high subfield, in the queue size high subfield of the BSR control subfield. The STA may set the queue size high subfield to 255 to indicate an unknown/unspecified queue size for that AC.

A HE STA may report the queue size for ACs indicated by the ACI bitmap subfield in the queue size all subfield of the BSR control subfield. The STA may set the queue size all subfield to 255 to indicate an unknown/unspecified BSR for those ACs.

Figure 6:
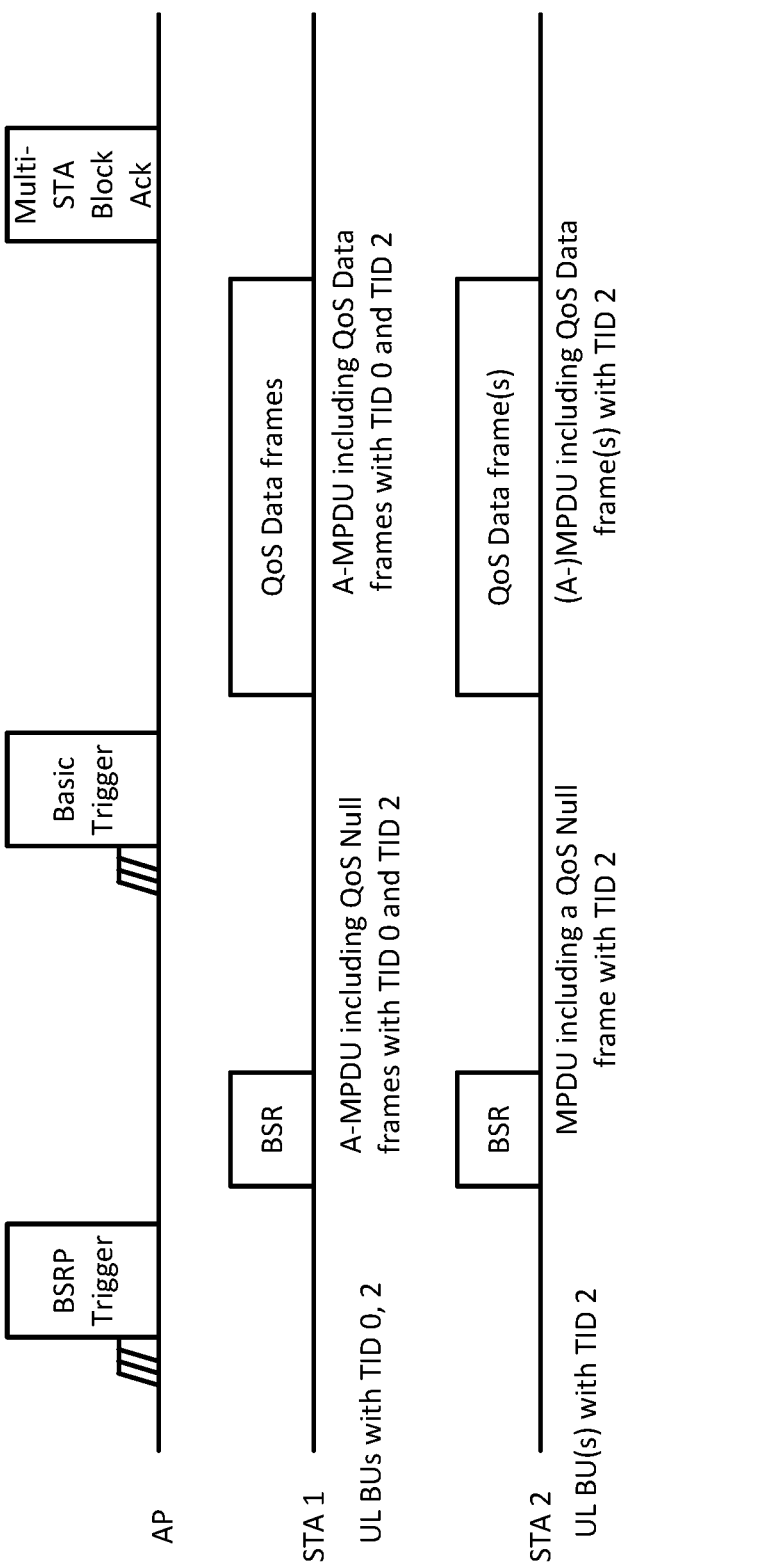
FIG. 6 illustrates an example that includes buffer status reporting by STAs, scheduling by an AP of uplink multi-user (MU) transmissions, and transmission of scheduled uplink transmissions by the STAs.

FIG. 6 illustrates an example that includes buffer status reporting by STAs, scheduling by an AP of uplink multi-user (MU) transmissions, and transmission of scheduled uplink transmissions by the STAs.

As shown, the AP may solicit one or more associated STAs (STA 1 and STA 2) for buffer status by sending a buffer status report poll (BSRP) trigger frame. Upon receiving the BSRP trigger frame, STA 1 and/or STA 2 may each generate a trigger-based (TB) PPDU if the BSRP trigger frame contains, in a User Info field, the 12 LSBs of the STA's AID.

STA 1 and/or STA 2 may each include in the TB PPDU one or more QoS null frames. The one or more QoS null frames may contain one or more QoS control fields or one or more BSR control subfields.

As described earlier, a QoS control field may include a queue size subfield for a TID for which the STA has a queue size to report to the AP. For example, as shown in FIG. 6, STA 1 may respond to the BSRP trigger frame from the AP by transmitting an A-MPDU including multiple QoS null frames. The QoS null frames each indicates, in its respective QoS control field, a queue size for a respective TID, e.g. TID 0 and TID 2. Similarly, STA 2 may respond to the BSRP trigger frame by transmitting an MPDU including a QoS null frame, which indicates a queue size for TID 2 in its QoS control field.

A BSR control subfield may include a queue size all subfield indicating the queue size for the ACs, indicated by the ACI bitmap subfield, for which the STA has a queue size to report to the AP if the AP has indicated its support for receiving the BSR control subfield. The STA sets a delta TID, a scaling factor, an ACI high, and the queue size high subfields of the BSR Control subfield.

On receiving the BSRs from STA 1 and STA 2, the AP may transmit a basic trigger frame to allocate UL MU resources to STA 1 and STA 2. In response, STA 1 may transmit a TB PPDU containing QoS data frames with TID 0 and TID 2 and STA 2 may transmit a TB PPDU containing one or more QoS data frame(s) with TID. The AP may acknowledge the transmitted TB PPDUs from STA 1 and STA 2 by sending a multi-STA block ack frame.

Figure 7:
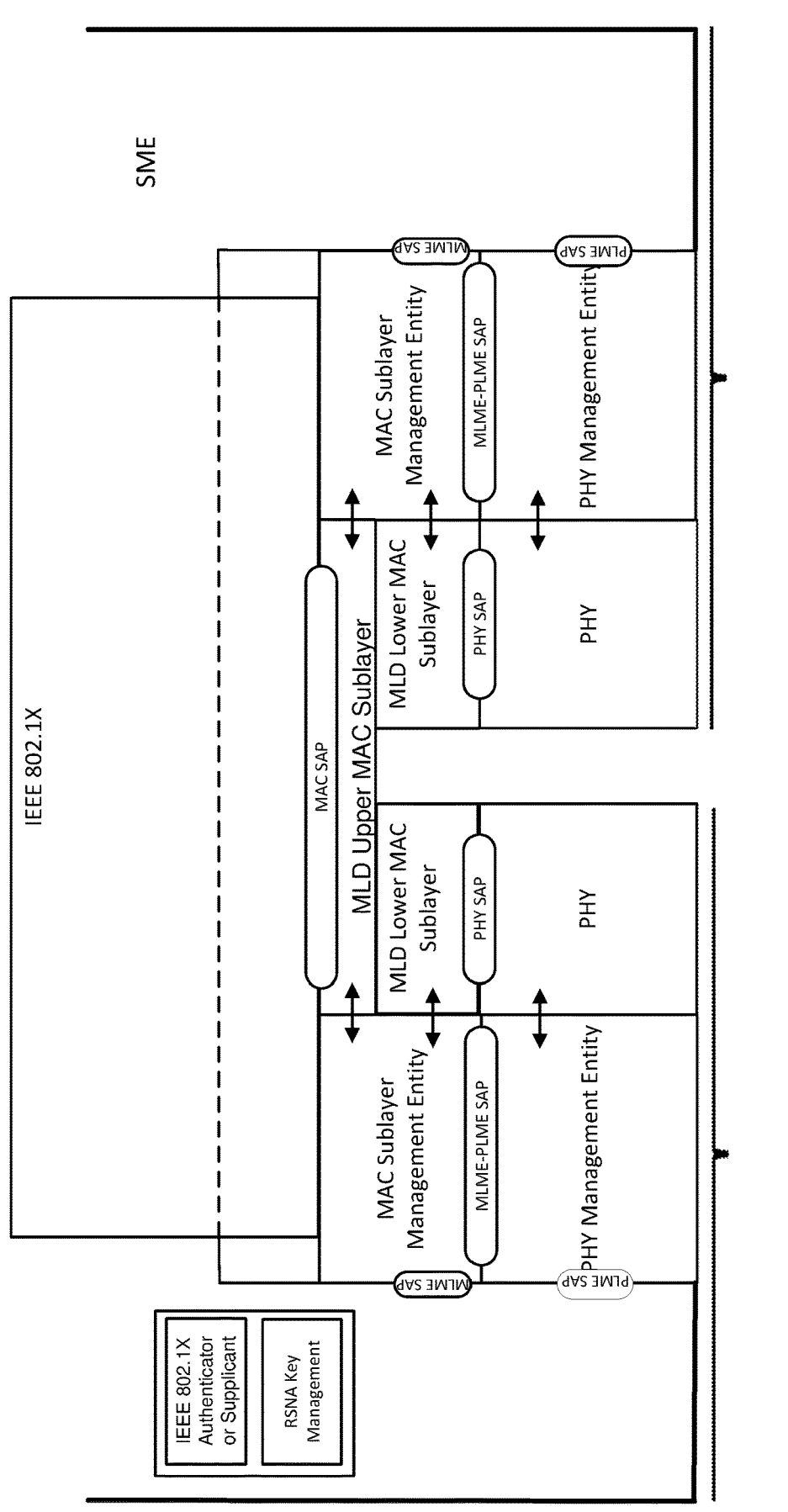
FIG. 7 illustrates an example reference model for a multi-link device (MLD).

FIG. 7 illustrates an example reference model for a multi-link device (MLD).

An MLD is an entity capable of managing communication over multiple links. The MLD may be a logical entity and may have more than one affiliated station (STA). An MLD may be an access point MLD (AP MLD) where a STA affiliated with the MLD is an AP STA (or an AP). An MLD may be a non-access point MLD (non-AP MLD) where a STA affiliated with the MLD is a non-AP STA (or an STA).

Communication across different frequency bands/channels may occur simultaneously, or not, depending on the capabilities of both of the communicating AP MLD and non-AP MLD.

As shown in FIG. 7, a MLD may have a single MAC service access point (MAC-SAP) to the LLC layer, which includes a MAC data service. The MLD may support multiple MAC sublayers, coordinated by a sublayer management entity (SME). Each AP STA (or non-AP STA) affiliated with an AP MLD (or non-AP MLD) has a different MAC address within the MLD.

The SME is responsible for coordinating the MAC sublayer management entities (MLMEs) of the affiliated STAs of the MLD to maintain a single robust security network association (RSNA) key management entity as well as a single IEEE 802.1X Authenticator or Supplicant for multi-link operation (MLO).

Multi-link operation (MLO) procedures allow a pair of MLDs to discover, synchronize, (de)authenticate, (re)associate, disassociate, and manage resources with each other on any common bands or channels that are supported by both MLDs. The Authenticator and the MAC-SAP of an AP MLD may be identified by the same AP MLD MAC address. The Supplicant and the MAC-SAP of a non-AP MLD may be identified by the same non-AP MLD MAC address.

Figure 8:
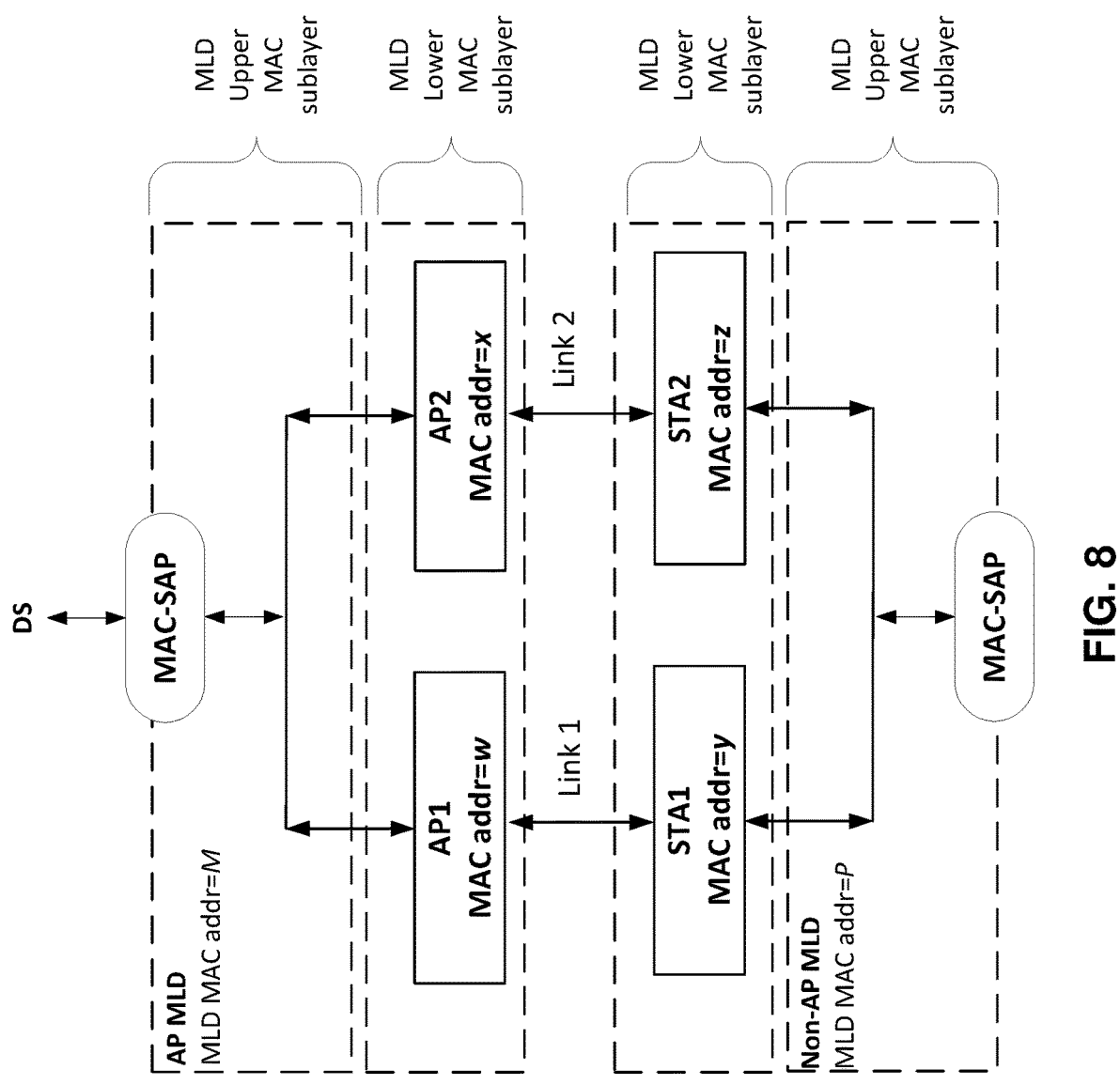
FIG. 8 illustrates an example of an AP MLD and an associated non-AP MLD.

FIG. 8 illustrates an example of an AP MLD and an associated non-AP MLD.

As shown, the AP MLD has two affiliated APs (AP1 and AP2), and the non-AP MLD has two affiliated STAs (STA 1 and STA 2). The AP MLD and the non-AP MLD may be communicatively coupled by two links (Link 1 and Link 2.) Link 1 is established between AP1 and STA1, and link 2 is established between AP2 and STA2.

Generally, the MAC addresses of an MLD and of its affiliated STAs are different from one another. For example, as shown in FIG. 8, the AP MLD may have MAC address M, AP 1 may have MAC address w, and AP2 may have with MAC address x. Similarly, the non-AP MLD may have MAC address P, STA 1 may have MAC address y, and STA2 may have MAC address z.

As shown in FIG. 8, with each MLD, the MAC sublayer may be further divided into an MLD upper MAC sublayer and an MLD lower MAC sublayer. The MLD upper MAC sublayer (MLD) performs functionalities that are common across all links. The MLD lower MAC sublayer performs functionalities that are local to each link. Some of the functionalities require joint processing of both the MLD upper and the MLD lower MAC sublayers.

The MLD upper MAC sublayer functions may include:

Authentication, association, and reassociation (between an AP MLD and a non-AP MLD);

Security association (e.g., pairwise master key security association (PMKSA), pairwise transient key security association (PTKSA)) and distribution of group temporal key (GTK)/integrity GTK (IGTK)/beacon IGTK (BIGTK);

Sequence number (SN)/packet number (PN) assignment for frames to be encrypted by pairwise transient key (PTK) for unicast frames;

Encryption/decryption using PTK for unicast frames;

Selection of the MLD lower MAC sublayer for transmission (TID-to-link mapping);

Reordering of packets to ensure in-order delivery per each Block Ack session;

Block Ack scoreboarding for individually addressed frames (in collaboration with the MLD lower MAC sublayer); optionally, the MLD upper MAC sublayer delivers the Block Ack record on one link to the MLD lower MAC sublayer of other links; and MLD level management information exchange/indication via the MLD lower MAC sublayer The MLD lower MAC sublayer functions may include:

Maintenance of link specific GTK/IGTK/BIGTK (between an AP affiliated with the AP MLD and a STA affiliated with the non-AP MLD);

Link-specific encryption/decryption/integrity protection and PN assignment using GTK/IGTK/BIGTK (between an AP affiliated with the AP MLD and a STA affiliated with the non-AP MLD);

Link specific management information exchange/indication (e.g., beacon);

Link specific control information exchange/indication (e.g., RTS/CTS, acknowledgements, etc.);

Power save state and mode;

MAC address filtering for frame reception; and

Block Ack scoreboarding for individually addressed frames (in collaboration with the MLD upper MAC sublayer); optionally, the MLD lower MAC sublayer receives the Block Ack record on the other links from the MLD upper MAC sublayer.

Multi-link (re)setup between a non-AP MLD and an AP MLD may include an exchange of (re)association request/response frames. A (re)association request/response frame exchange for a multi-link setup may include both frames carrying a basic multi-link element.

In the (re)association request frame, the non-AP MLD indicates the links that are requested for (re)setup and the capabilities and operational parameters of the requested links. The non-AP MLD may request to (re)set up links with a subset of APs affiliated with the AP MLD. The links that are requested for (re)setup and the capabilities and operation parameters of requested links are independent of existing setup links with an associated AP MLD and the capabilities and operation parameters of setup links.

In the (re)association response frame, the AP MLD may indicate the requested links that are accepted and the requested links that are rejected for (re)setup and the capabilities and operational parameters of the requested links. The AP MLD may accept a subset of the links that are requested for (re)setup. The (re)association response frame is sent to the non-AP STA, affiliated with the non-AP MLD, that sent the (re)association request frame.

An MLD that requests or accepts multi-link (re)setup for any two links ensures that each link is located on a different nonoverlapping channel. After successful multi-link (re) setup between a non-AP MLD and an AP MLD, the non-AP MLD and the AP MLD set up links for multi-link operation, and the non-AP MLD is (re)associated with the AP MLD. For each setup link, the corresponding non-AP STA affiliated with the non-AP MLD is in the same associated state as the non-AP MLD and is associated with a corresponding AP affiliated with the AP MLD. For each setup link, functionalities between a non-AP STA and its associated AP are enabled unless the functionalities have been extended to the MLD level or specified otherwise.

Figure 9:
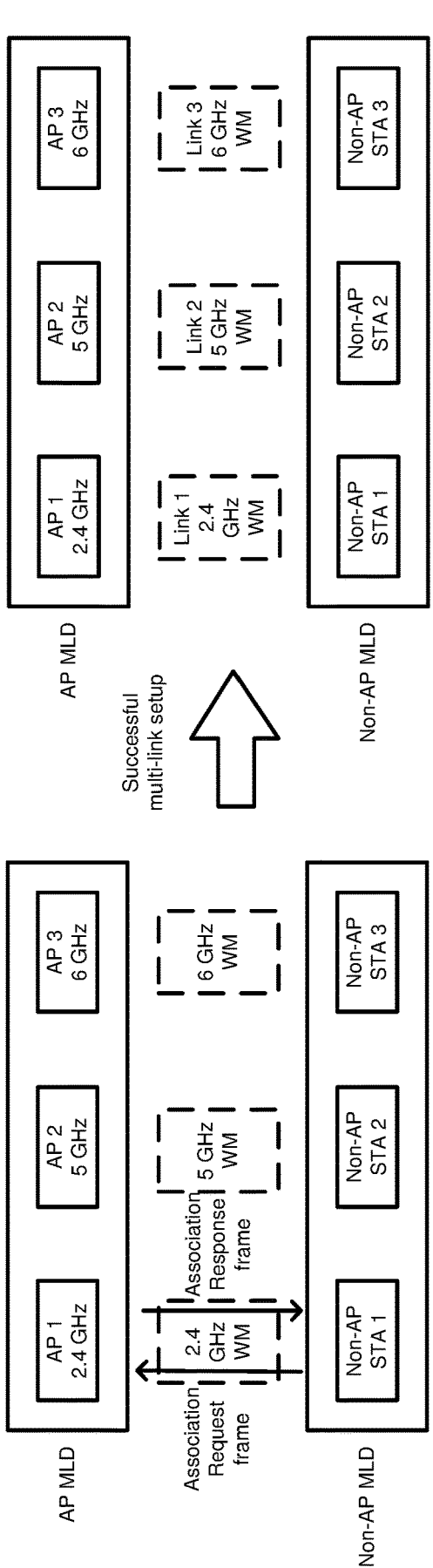
FIG. 9 illustrates an example of a multi-link setup between an AP MLD and a non-AP MLD.

FIG. 9 illustrates an example of a multi-link setup between an AP MLD and a non-AP MLD. As shown, the AP MLD has three affiliated APs: AP 1 operating in the 2.4 GHz band, AP 2 operating in the 5 GHz band, and AP 3 operating in the 6 GHz band. The non-AP MLD has three affiliated STAs: non-AP STA 1 operating in the 2.4 GHz band, non-AP STA 2 operating in the 5 GHz band, and non-AP STA 3 operating in the 6 GHz band.

The non-AP MLD may initiate multi-link setup by non-AP STA 1 sending an association request frame to AP 1 affiliated with the AP MLD. In the association request frame, the transmitter address (TA) field is set to the MAC address of non-AP STA 1 and the receiver address (RA) field is set to the MAC address of AP 1. The association request frame includes a basic multi-link element that indicates the MLD MAC address of the non-AP MLD and complete information of non-AP STA 1, non-AP STA 2, and non-AP STA 3. The association request frame may request the setup of three links between the non-AP MLD and the AP MLD (a link between AP 1 and non-AP STA 1, a link between AP 2 and non-AP STA 2, and a link between AP 3 and non-AP STA 3).

The AP MLD may respond to the requested multi-link setup by AP sending an association response frame to non-AP STA 1 affiliated with the non-AP MLD. In the association response frame, the TA field is set to the MAC address of the AP 1 and the RA field is set to the MAC address of the non-AP STA 1. The association response frame includes a basic multi-link element that indicates the MLD MAC address of the AP MLD and complete information of AP 1, AP 2, and AP 3. The association response frame signals successful multi-link setup by the setup of three links between the non-AP MLD and AP MLD (link 1 between AP 1 and non-AP STA 1, link 2 between AP 2 and non-AP STA 2, and link 3 between AP 3 and non-AP STA 3).

By default, all TIDs at the non-AP MLD are mapped to all setup links for both uplink and downlink. The TID-to-link mapping mechanism allows an AP MLD and a non-AP MLD that performed or are performing multi-link setup to specify how UL and DL QoS traffic corresponding to different TIDs (e.g., between 0 and 7) may be assigned to the setup links. In a negotiated TID-to-link mapping, a TID may be mapped to a link set, which is a subset of setup links, ranging from a single setup link to all the setup links.

A setup link is defined as enabled for a non-AP MLD if at least one TID is mapped to that link either in DL or in UL, and is defined as disabled if no TIDs are mapped to that link both in DL and UL. At any point in time, a TID is always mapped to at least one setup link both in DL and UL, which means that a TID-to-link mapping change can only be valid and successful if it does not result in a TID having a mapped link set made of zero setup links.

By default, all setup links are enabled. If a link is enabled for a non-AP MLD, it may be used for the exchange of individually addressed frames, subject to the power state of the non-AP STA operating on that link. Only MSDUs or A-MSDUs with TIDs mapped to a link may be transmitted on that link in the direction (DL/UL) corresponding to the TID-to-link mapping. Individually addressed management frames and control frames may be sent on any enabled link between an affiliated STA of the non-AP MLD and a corresponding AP of the AP MLD, both in DL and UL.

If a link is disabled for a non-AP MLD, the link may not be used for the exchange of individually addressed frames between an affiliated STA of the non-AP MLD and a corresponding AP of the AP MLD.

If a TID is mapped in UL to a set of enabled links for a non-AP MLD, the non-AP MLD may use any link within this set of enabled links to transmit individually addressed MSDUs or A-MSDUs corresponding to that TID.

If a TID is mapped in DL to a set of enabled links for a non-AP MLD, the non-AP MLD may retrieve individually addressed BUs buffered at the AP MLD that are MSDUs or A-MSDUs corresponding to the TID, on any link of the set of enabled links. Conversely, the AP MLD may use any link within the set of enabled links to transmit individually addressed MSDUs or A-MSDUs corresponding to the TID, subject to the power state of the non-AP STA on each of the used link.

If the default mode is used, the non-AP MLD may retrieve BUs buffered by the AP MLD on any setup link, though the AP MLD may recommend a link.

A non-AP MLD may retrieve buffered BUs that are MMPDUs buffered at the AP MLD on any enabled link. An AP MLD may use any enabled link to transmit individually addressed bufferable management frames that are not measurement MMPDUs, subject to the power state of the non-AP STA on the used link.

If a STA affiliated with a non-AP MLD is in active mode on a link with a set of TIDs mapped for DL transmission, its associated AP affiliated with the AP MLD may transmit to the STA: MSDUs/A-MSDUs for the set of mapped TIDs for the non-AP MLD; and MMPDUs that are not measurement MMPDUs for the non-AP MLD or its affiliated STAs, unless the frames are transmitted to another STA affiliated with the same non-AP MLD and in active mode.

As mentioned above, under the default mapping mode, all TIDs are mapped to all setup links for DL and UL, and all setup links are enabled. A non-AP MLD and an AP MLD that perform multi-link setup shall operate under this mode if a TID-to-link mapping negotiation for a different mapping has not occurred, was unsuccessful, or was torn down.

In a multi-link (re)setup procedure, a non-AP MLD may initiate a TID-to-link mapping negotiation by including a TID-to-link mapping element in a (re)association request frame if an AP MLD has indicated support for TID-to-link mapping negotiation. After receiving the (re)association request frame containing the TID-to-link mapping element, the AP MLD may reply to the (re)association request frame in according to the following rules. The AP MLD can accept the requested TID-to-link mapping indicated in the TID-to-link mapping element in the received (re)association request frame only if it accepts the multi-link (re)setup for all links on which at least one TID is requested to be mapped. In this case, the non-AP MLD does include in the (re)association response frame a TID-to-link mapping element. Otherwise, the non-AP MLD indicates rejection of the proposed TID-to-link mapping by including in the (re)association response frame a TID-to-link mapping element that suggests a preferred TID-to-link mapping.

Following a successful multi-link (re)setup, to negotiate a new TID-to-link mapping, an initiating MLD may send an individually addressed TID-to-link mapping request frame to a responding MLD that has indicated support of TID-to-link mapping negotiation.

On receiving the individually addressed TID-to-link mapping request frame, the responding MLD sends an individually addressed TID-to-link mapping response frame to the initiating MLD according to the following rules. The responding MLD may accept the requested TID-to-link mapping indicated in the TID-to-link mapping element in the received TID-to-link mapping request frame by transmitting a TID-to-link mapping response frame. Otherwise, the responding MLD may indicate rejection of the proposed TID-to-link mapping in the TID-to-link mapping response frame. The responding MLD may suggest a preferred TID-to-link mapping in the TID-to-link mapping response frame by including the TID-to-link mapping element in the TID-to-link mapping response frame.

An MLD may suggest a preferred TID-to-link mapping to a peer MLD by sending an unsolicited TID-to-link mapping response frame that includes a TID-to-link mapping element.

When a peer MLD indicates a preferred TID-to-link mapping, an MLD may take into account the preferred TID-to-link mapping when it initiates a new TID-to-link mapping. In addition, an AP MLD may take into account the traffic flow(s) affiliated with the non-AP MLD and the capabilities and constraints (if any) of the non-AP MLD.

When two MLDs have negotiated a TID-to-link mapping, either MLD may tear down the negotiated TID-to-link mapping by sending an individually addressed TID-to-link mapping teardown frame. After teardown, the MLDs operates in default mapping mode.

When an MLD successfully negotiates a TID-to-link mapping with a peer MLD, both the MLD and the peer MLD update an uplink and/or downlink TID-to-link mapping information according to the negotiated the TID-to-link mapping.

When an MLD has successfully negotiated with a peer MLD an uplink and/or downlink TID-to-link mapping in which the bit position i of a link mapping field n in the TID-to-link mapping element is set to 0, a TID n shall not be mapped to the link associated with the link ID i in uplink and/or downlink. When an MLD has successfully negotiated with a peer MLD an uplink and/or downlink TID-to-link mapping in which the bit position i of a link mapping field n in the TID-to-link mapping element is set to 1, the TID n is mapped to the link associated with the link ID i in uplink and/or downlink.

Figure 10:
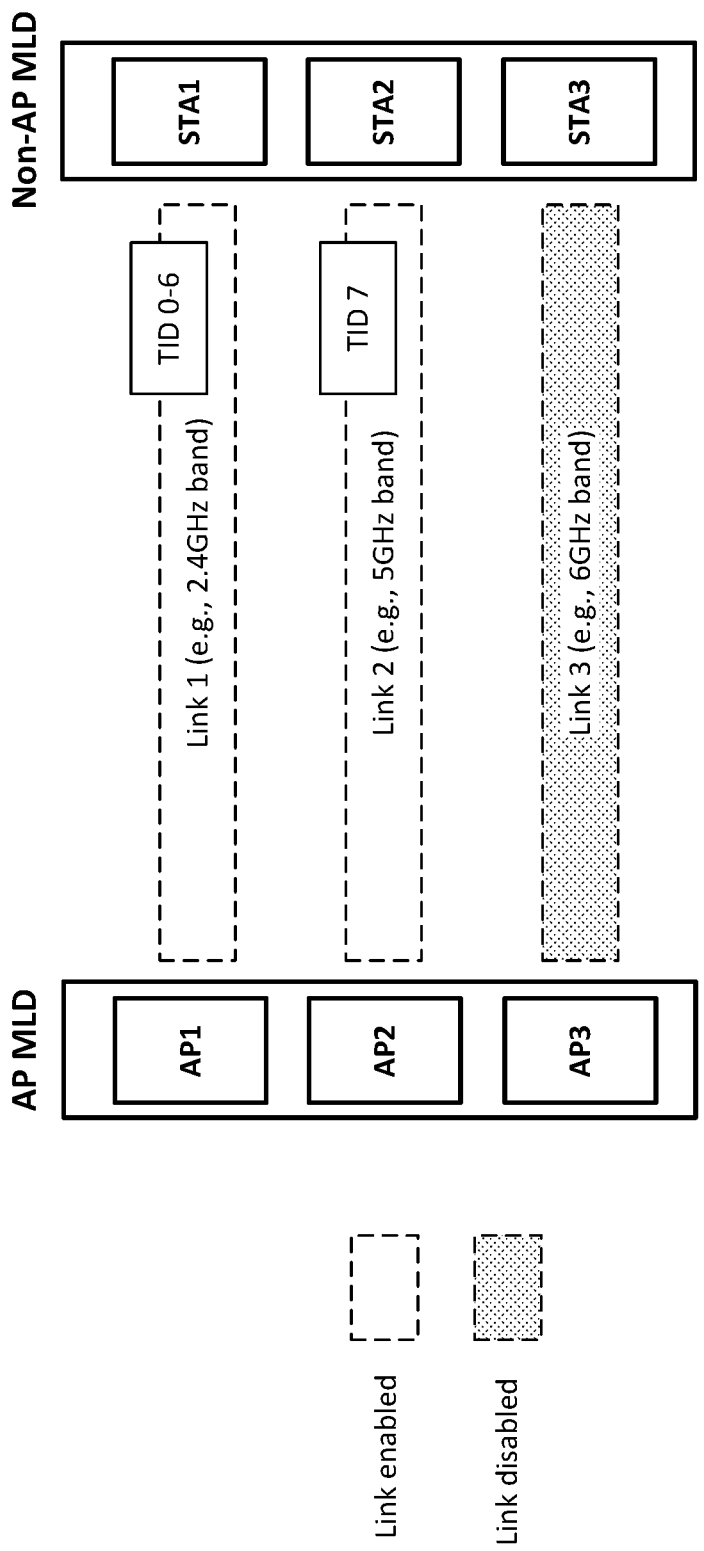
FIG. 10 illustrates an example of a traffic identifier (TID)-to-link mapping in a multi-link communication environment.

FIG. 10 illustrates an example of a TID-to-link mapping in a multi-link communication environment. As shown, the multi-link communication environment includes an AP MLD having three affiliated APs and a non-AP MLD having three affiliated STAs.

During or after multi-link setup, the non-AP MLD and the AP MLD may negotiate a TID-to-link mapping. The TID-to-link mapping maps TIDs at the non-AP MLD in UL and DL to setup links between the AP MLD and the non-AP MLD. For example, as shown in FIG. 10, the TID-to-link mapping may map TIDs 0-6 in both UL and DL to link 1 and TID 7 in both UL and DL to link 2. As such, links 1 and 2 are enabled, and link 3 is disabled. The TID-to-link mapping negotiation may be performed by exchanging an association request/response frame or a TID-to-link mapping request/response frame between the non-AP MLD and the AP MLD.

Figure 11:
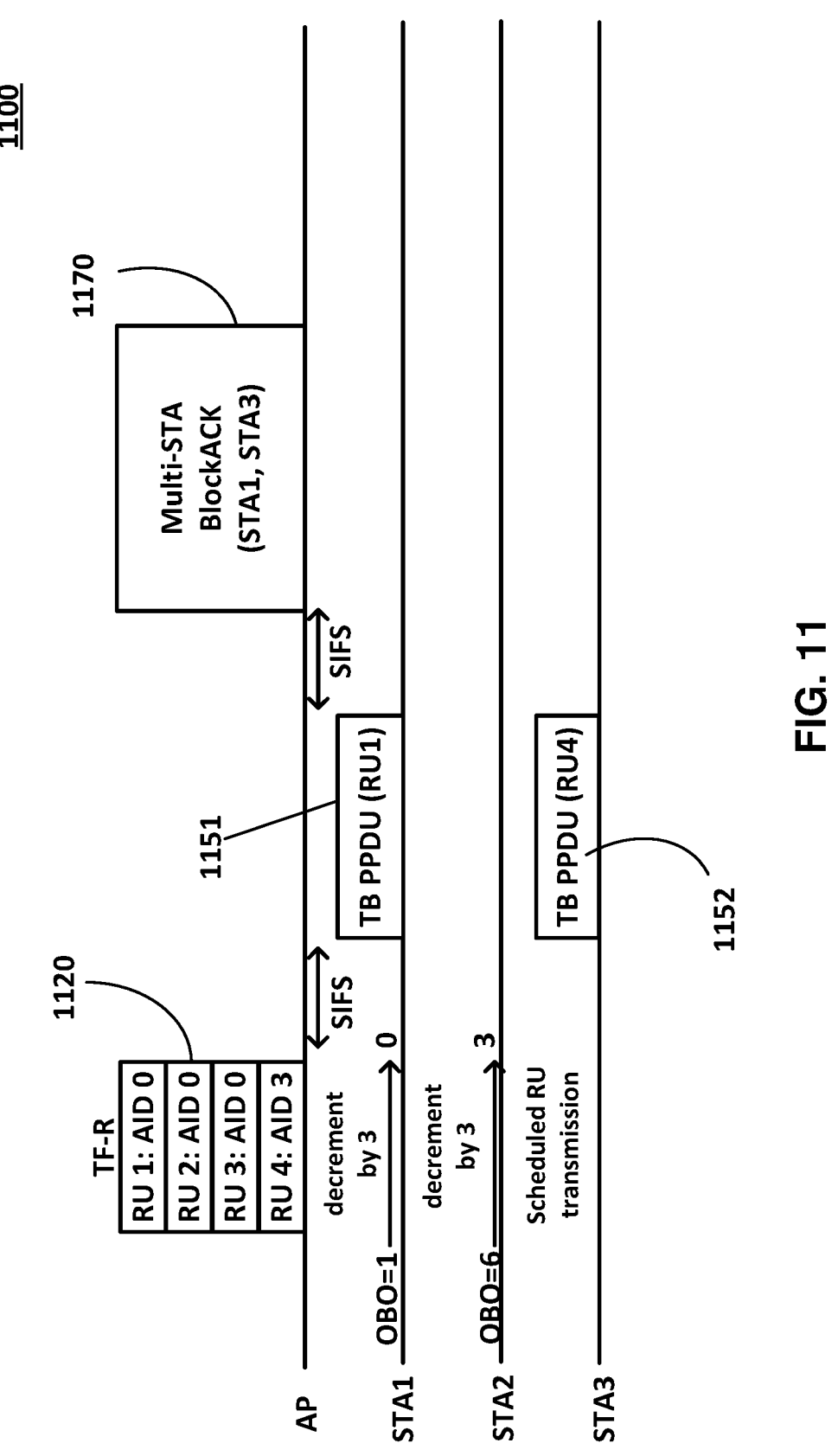
FIG. 11 illustrates an example of Uplink Orthogonal Frequency Division Multiple Access (OFDMA) Random Access (UORA) operation.

FIG. 11 illustrates an example 1100 of Uplink OFDMA Random Access (UORA) operation. For the purpose of illustration, example 1100 is described with reference to an example WLAN environment that includes an AP and a plurality of STAs (STA1, STA2, and STA3). The plurality of STAs may each be associated or not associated with the AP.

The AP may support UORA operation. As such, the AP may transmit a Basic Trigger frame, a Bandwidth Query Report Poll (BQRP) Trigger frame, or a BSRP Trigger frame that contains one or more resource units (RUs) for random access. A User Info field in a trigger frame whose 12-bit AID subfield is set to 0 indicates an allocation of one or more contiguous random access RUs (RA-RUs) for associated STAs. Similarly, a User Info field in a trigger frame whose 12-bit AID subfield is set to 2045 indicates an allocation of one or more contiguous RA-RUs for unassociated STAs.

Figure 12:
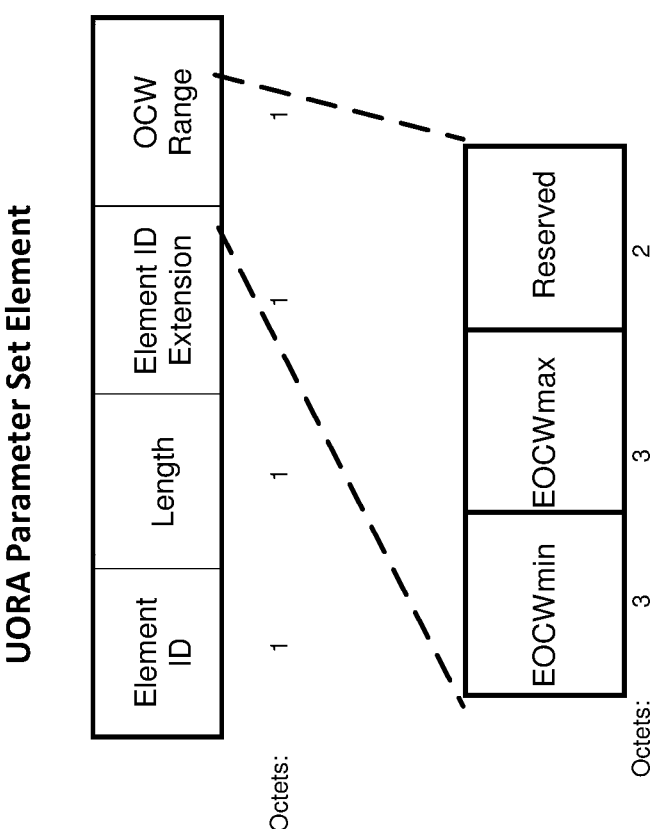
FIG. 12 illustrates an example UORA Parameter Set element.

FIG. 12 illustrates an example UORA Parameter Set element 1200. An AP may include a UORA Parameter Set element, such as element 1200, in management frames that it transmits. As shown in FIG. 12, example UORA Parameter Set element 1200 may include an element ID field, a length field, an Element ID Extension field, and an OCW range field.

The element ID and the Element ID Extension field values are set to 255 and 37 respectively, thereby uniquely identifying the UORA Parameter Set element from other information elements sent by the AP in management frames.

The Length field indicates the number of octets in the element excluding the Element ID and Length fields.

The OCW Range field indicates the range of an OFDMA contention window for STAs to initiate random access following transmission of the trigger frame. As shown, the OCW range field includes an EOCWmin subfield, an EOCWmax subfield, and a Reserved subfield.

The EOCWmin subfield indicates a minimum value of OCW (OCWmin) for initial TB PPDU transmission using UORA. The OCWmin parameter is used by a STA either for an initial transmission or following a successful TB PPDU transmission. The OCWmin parameter may be derived as follows: OCWmin=2^EOCWmin−1, where EOCWmin is the value in the EOCWmin subfield. The EOCWmax subfield indicates a maximum value of OCW (OCWmax) for UORA. The OCWmax parameter is used by a STA for retransmission attempts of UORA. The OCWmax parameter may be derived using OCWmax=2^EOCWmax−1, where EOCWmax is the value in the EOCWmax subfield. The Reserved subfield can be used for signaling future features related to the UORA operation and may be set to 0.

A STA that supports UORA maintains an internal OCW. OCW is an integer in the range of OCWmin to OCWmax. A STA updates the OCWmin and OCWmax variables from a UORA Parameter Set element within an interval of time equal to one beacon interval after receiving an updated UORA Parameter Set element carried in a beacon, Probe Response, or (Re)Association Response frame transmitted by its associated AP. An unassociated non-AP STA that has not received a UORA Parameter Set element from the AP with which it intends to communicate uses a default OCWmin of 7 and a default OCWmax of 31.

A STA that supports UORA also maintains an internal OFDMA random access backoff (OBO) counter which is initialized in the range of 0 to OCW. A STA whose TB PPDU transmission sent in an RA-RU indicated by a trigger frame is unsuccessful, may attempt to retransmit the failed PPDU using EDCA or as a response to a trigger frame. If the TB PPDU is not successfully transmitted in the selected RA-RU, then the STA shall update its OCW to 2×OCW+1, as long as the OCW is less than the value of OCWmax. The STA then shall randomly select its OBO counter in the range of 0 and the updated OCW. Once the OCW reaches OCW-max for successive retransmission attempts, the OCW remains at the value of OCWmax. A STA updates its OCW value under the condition that the updated OCW remains in the range OCWmin to OCWmax obtained from the most recently received UORA Parameter Set element. If the updated OCW becomes greater than OCWmax as a consequence of receiving a modified UORA Parameter Set element, then the STA sets the value of OCW to the new OCWmax value.

Returning to FIG. 11, in the shown UORA operation, the AP may transmit a trigger frame 1120 with 3 RA-RUs (RU1, RU2, and RU3, indicated by the AID value of 0) and a scheduled RU (RU4, indicated by the AID value of 3) assigned to STA3 (which AID is equal to 3).

It is assumed, in this example, that STA1 and STA2 have previously initialized their OBO counters to 1 and 6 respectively. Upon receiving the trigger frame 1120, STA1 and STA2 which have pending frames for the AP, decrement their respective OBO counters by the number of eligible RA-RUs indicated in the trigger frame 1120 (i.e., three RA-RUs). As the OBO counter of STA1 decrements to 0 (negative OBO are clipped to 0), STA1 may transmit pending frames (e.g., in a TB PPDU 1151) on RU1, which STA1 may randomly select from the eligible set of RUs (i.e., RU1, RU2, and RU3). The OBO counter of STA2 decrements to a nonzero value (3). STA2 maintains the new OBO value (3) until it receives a later trigger frame carrying RA-RUs for associated STAs.

STA3, which also has pending frames for the AP, is allocated a dedicated RU (RU4). STA3 thus does not contend for RA-RUs and instead transmits pending frames on RU4 (e.g., in a TB PPDU 1152).

In this example, the TB PPDUs 1151 and 1152 from STA1 and STA3 contain frames that solicit an immediate response. Hence, the AP transmits a multi-STA block ACK frame 1170 in response to TB PPDUs 1151 and 1152. The reception of the multi-STA block ACK frame 1170 by STA1 and STA3 respectively indicates to STA1 and STA3 that the transmission of TB PPDU 1151 and 1152 respectively was successful. If no such acknowledgement is received by STA1 or STA3, the respective PPDU transmission is considered unsuccessful.

After a successful TB PPDU transmission in an RA-RU, a STA sets the value of its OCW to the OCWmin indicated in the latest UORA Parameter Set element from the AP or to the default OCWmin (if a UORA Parameter Set element was not received). The STA shall also initialize its OBO counter to an integer value randomly selected from a uniform distribution in the range 0 to OCW.

Figure 13:
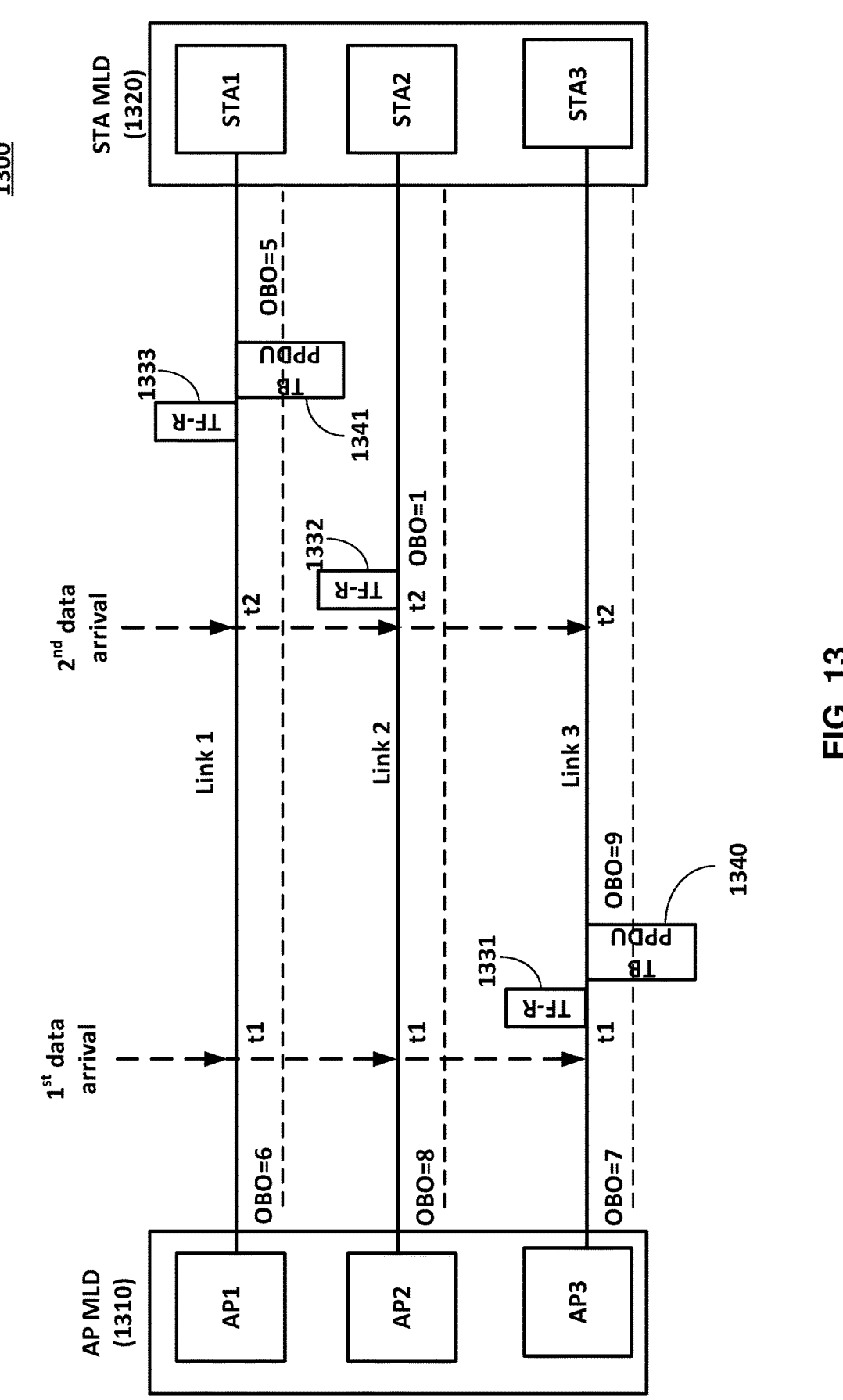
FIG. 13 illustrates an example UORA operation in a multi-link environment.

FIG. 13 illustrates an example 1300 of UORA operation in an example multi-link environment. As shown, example 1300 includes an AP multi-link device (AP MLD) 1310 and non-AP multi-link device (non-AP MLD) or STA MLD 1320. AP MLD 1310 has 3 affiliated APs, AP1, AP2, and AP3 and STA MLD 1320 has 3 affiliated STAs, STA1, STA2, and STA3.

It is assumed, in this example, that STA MLD 1320 uses a default TID-to-Link mapping where all TIDs are mapped to all setup links (link 1 to link 3). AP1 and STA1 communicate using link 1, AP2 and STA2 communicate using link 2, and AP3 and STA3 communicate using link 3.

AP MLD 1310 enables UORA operation on links 1 to 3 by sending random access trigger frames (TF-R) 1331, 1332, and 1333 on links 3, 2, and 1, respectively. Each of TF-R 1331, 1132, and 1333 may include 7 RA-RUs.

STA1, STA2 and STA3 each independently initializes its OBO counter and is configured to decrement its OBO counter according to the number of RA-RUs indicated in TF-Rs received on its respective link. In this example, STA1, STA2, and STA3 initialize their respective OBO counters to 6, 8, and 7 respectively.

In an example, a first data arrival at a time t1 for STA MLD 1320 causes STA MLD 1320 to contend for random access on all of its enabled links. When TF-R 1331 is received on link 3, STA 3 decrements its OBO counter to 0 (7-7 RA-RUs), which allows STA MLD 1320 to transmit a TB PPDU 1340 on link 3 via STA3. STA3 then reinitializes its OBO counter using an OCWmin parameter (e.g., to the value 9).

A second data packet arrival at a time t2 for STA MLD 1320 causes STA MLD 1320 to contend again for random access on all of its enabled links. When TF-R 1332 is received on link 2, STA2 decrements its OBO counter to 1 (8-7 RA-RUs). As the OBO of STA2 is still a non-zero value, STA MLD 1320 may not transmit the pending packet on an RA-RU indicated by TF-R 1332 on link 2. However, when TF-R 1333 is received, STA1 decrements its OBO counter to zero (6-7 RA-RUs). This allows STA MLD 1320 to transmit the pending packet in a TB PPDU 1341 on an RA-RU indicated by TF-R 1333. STA1 then reinitializes its OBO counter for a future random access transmission (e.g., to the value 5).

Figure 14:
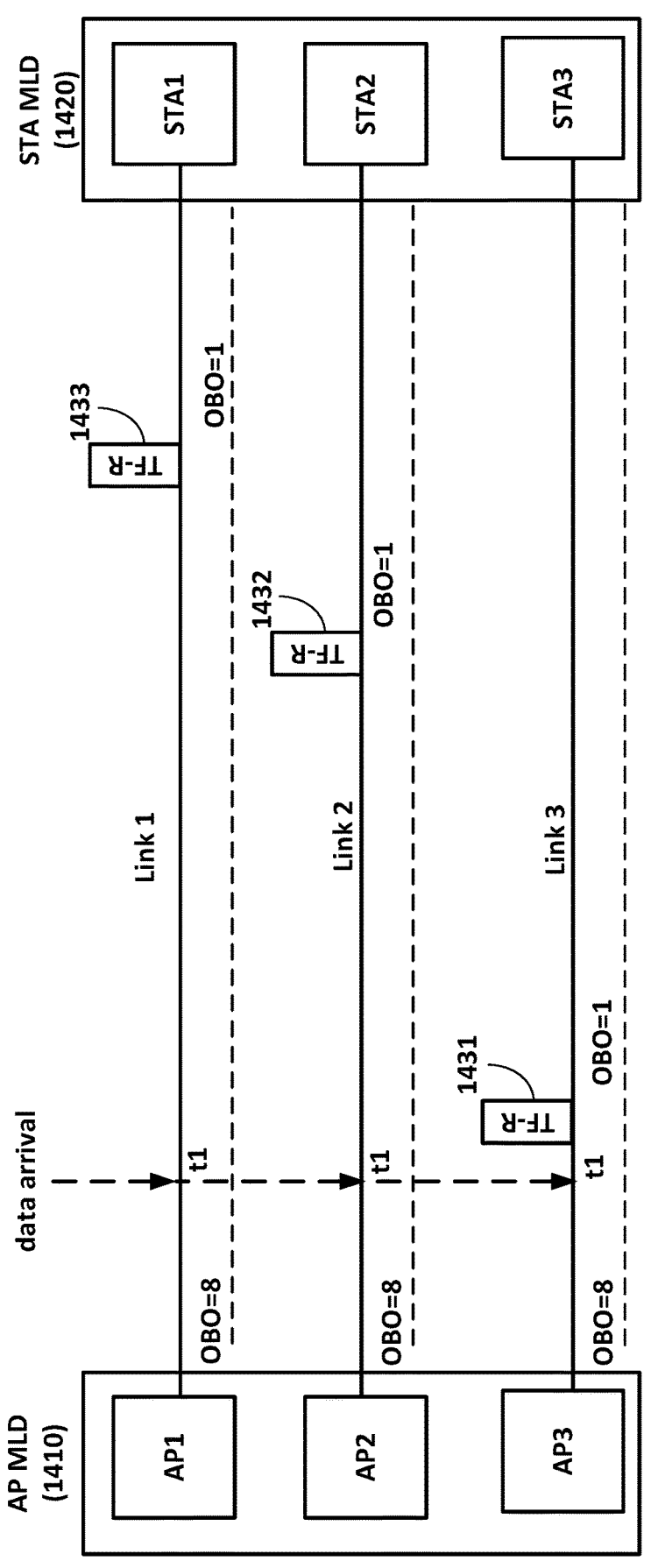
FIG. 14 illustrates an inefficiency of existing UORA operation in a multi-link environment.

FIG. 14 illustrates an inefficiency of existing UORA operation in an example multi-link environment 1400. As shown, example multi-link environment 1400 includes an AP MLD 1410 and a STA MLD 1420. AP MLD 1410 has 3 affiliated APs, AP1, AP2 and AP3 and STA MLD 1420 has 3 affiliated STAs, STA1, STA2 and STA3.

It is assumed, in this example, that STA MLD 1420 uses a default TID-to-Link mapping where all TIDs are mapped to all setup links (link 1 to link 3). AP1 and STA1 communicate using link 1, AP2 and STA2 communicate using link 2, and AP3 and STA3 communicate using link 3.

AP MLD 1410 enables UORA operation in links 1 to 3 by sending TF-Rs 1431, 1432, and 1433 on links 3, 2, and 1, respectively. Each of TF-R 1431, 1432, and 1433 may include 7 RA-RU allocations.

STA1, STA2, and STA3 each independently initializes its OBO counter and is configured to decrement its OBO counter according to the number of RA-RUs indicated in TF-Rs received on its respective link. For example, as shown in FIG. 14, STA1, STA2, and STA3 initialize their respective OBO counters to 8, 8, and 8, respectively.

In an example, a data arrival at a time t1 for STA MLD 1420 causes STA MLD 1420 to contend for random access on all of its enabled links. When TF-R 1431 is received on link 3, STA3 decrements its OBO counter to 1 (8-7 RA-RUs). As the OBO counter on link 3 is a non-zero value, STA MLD 1420 may not transmit the pending packet on an RA-RU indicated by TF-R 1431.

When TF-R 1432 is received on link 2, STA2 also decrements its OBO counter to 1, which also does not permit STA MLD 1420 to transmit the pending packet on an RA-RU indicated by TF-R 1432. Similarly, when TF-R 1433 is received on link 1, STA1 decrements its OBO counter to 1, which still does not permit STA MLD 1420 to transmit the pending packet on an RA-RU indicated by TF-R 1433. Hence, even with three enabled links and a TF-R received on each link, STA MLD 1420 is unable to transmit its pending packet. This inefficiency of operation clearly leads to a high worst case latency for STA MLD transmission.

Embodiments of the present disclosure, as further described below, address the above-described inefficiency in existing UORA operation in a multi-link environment. In one aspect, embodiments propose a multi-link UORA operation enhanced with a multi-link OFDMA backoff (m-OBO) counter. The proposed operation is hereinafter referred to as m-OBO enhanced ML UORA.

Figure 15:
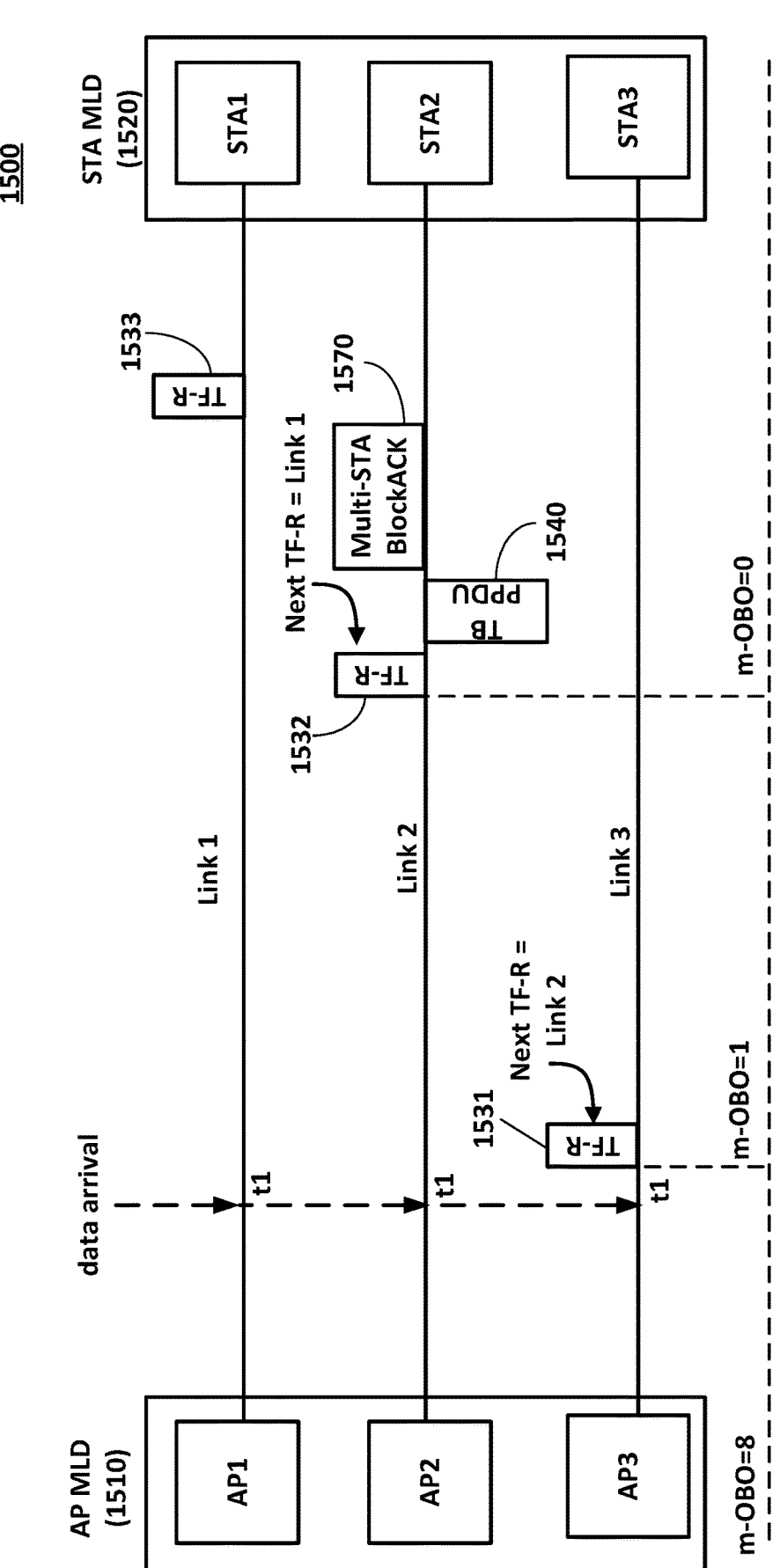
FIG. 15 illustrates an example operation of multi-link (ML) UORA enhanced with a multi-link backoff counter (m-OBO enhanced ML UORA) in an example multi-link environment.

FIG. 15 illustrates an example operation of m-OBO enhanced ML UORA in an example multi-link environment 1500. As shown, example multi-link environment 1500 includes an AP MLD 1510 and a STA MLD 1520. AP MLD 1510 has 3 affiliated APs, AP1, AP2, and AP3 and STA MLD 1520 has 3 affiliated STAs, STA1, STA2, and STA3.

It is assumed, in this example, that STA MLD 1520 uses a default TID-to-Link mapping where all TIDs are mapped to all setup links (link 1 to link 3). AP1 and STA1 communicate using link 1, AP2 and STA2 communicate using link 2, and AP3 and STA3 communicate using link 3.

AP MLD 1510 enables UORA operation in links 1 to 3 by sending TF-Rs 1531, 1532, and 1533 on links 3, 2, and 1, respectively. Each of TF-R 1531, 1532, and 1533 may include 7 RA-RU allocations.

In an embodiment of m-OBO enhanced ML UORA, STA MLD 1520 initializes an m-OBO counter and decrements the m-OBO counter according to the number of RA-RUs indicated in a TF-R received on any enabled link. For example, as shown in FIG. 15, STA MLD 1520 may initialize its m-OBO counter to 8.

In an example, a data arrival at a time t1 for STA MLD 1520 causes STA MLD 1520 to contend for random access on all its enabled links. When TF-R 1531 is received on link 3, STA MLD 1520 decrements the m-OBO counter to 1 (8-7 RA-RUs). As the m-OBO counter is a non-zero value, STA MLD 1520 may not transmit the pending packet on an RA-RU indicated by TF-R 1531.

When TF-R 1532 is received on link 2, the m-OBO counter is decremented to zero allowing STA MLD 1520 to transmit the pending packet in a TB PPDU 1540 on an RA-RU indicated by TF-R 1532. After transmission of TB PPDU 1540 on link 2, AP MLD 1510 sends a multi-STA block ACK frame 1570 to STAs, including STA2 which transmitted TB PPDU 1540 in response to TF-R 1532.

In an embodiment, a TB PPDU sent after a TF-R may be, but is not limited to, a High Efficiency Trigger-Based PDDU (HE TB PPDU) or an Extremely High Throughput Trigger-Based PPDU (EHT TB PPDU) as defined in the IEEE 802.11ax and 802.11be amendments respectively. Whether the TB PPDU is an HE TB PPDU or an EHT TB PPDU or any other TB PPDU variant, the AP indicates the correct format in the TF-R. Depending on the TF-R indications, an OFDMA PPDU or an MU MIMO PPDU can also be solicited for transmission in the RA-RUs. The TB PPDU may be sent within a Short Interframe Space (SIFS) duration of the TF-R and on the same link as the TF-R.

Multi-STA block ACK frame 1570 sent by AP MLD 1510 to STA2 transmitting TB PPDU 1540 may also be an ACK, a single TID block ACK, a multi-TID block ACK, a multi-STA ACK, or a multi-STA multi-TID block ACK.

In an embodiment, TF-R 1531 may include signaling that informs STA MLD 1520 of the presence of a scheduled trigger frame (e.g., TF-R 1532) to be sent on link 2. Likewise, TF-R 1532 may include a signaling that informs STA MLD 1520 of a scheduled trigger frame (e.g., TF-R 1533) to be sent on link 1. This TF-R signaling allows STA MLD 1520 to decide whether to continue ML UORA access for transmitting its pending packet in TB PPDUs or to use other access mechanisms such as EDCA.

Figure 16:
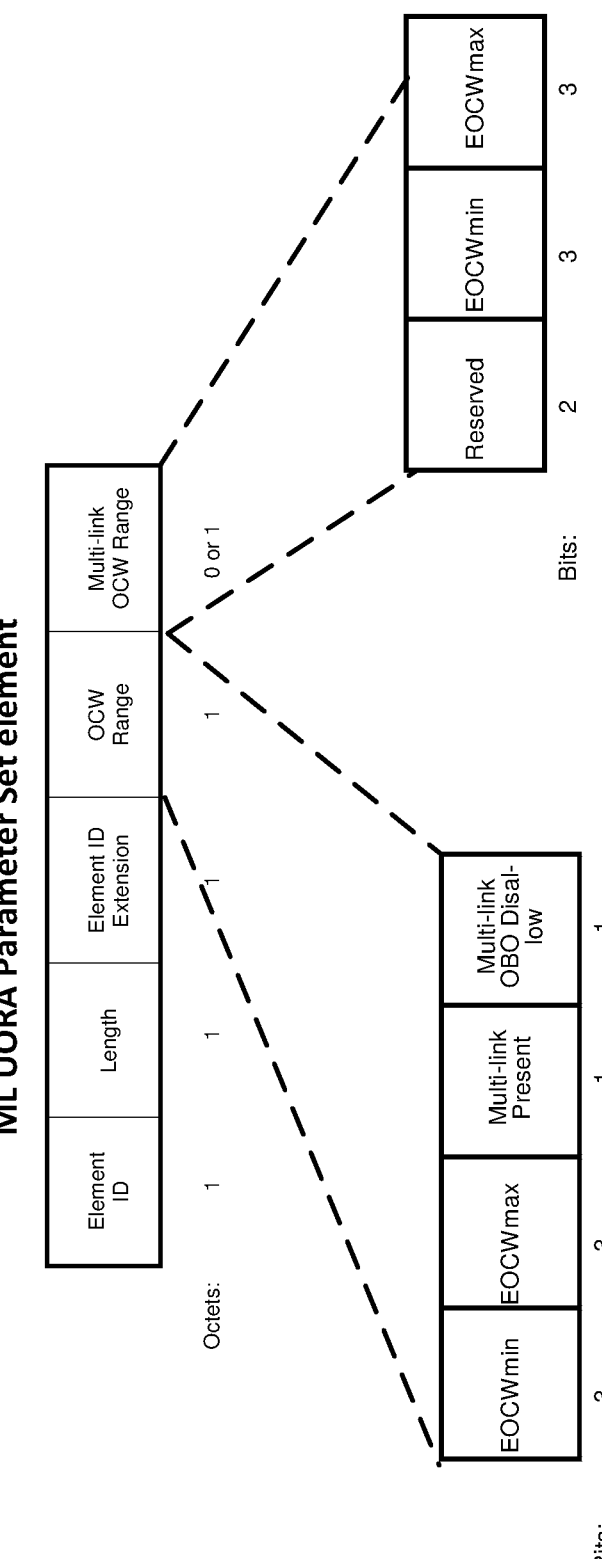
FIG. 16 is an example of an ML UORA Parameter Set element which may be used in m-OBO enhanced ML UORA.

FIG. 16 is an example of an ML UORA Parameter Set element 1600 which may be used in m-OBO enhanced ML UORA. Example ML UORA Parameter Set element 1600 is a variant of example UORA Parameter Set element 1200 described with reference to FIG. 12 above. As shown, example ML UORA Parameter Set element 1600 may include an Element ID field, a Length field, an Element ID Extension field, an OCW Range field, and an optional Multi-link OCW Range field.

The Element ID and the Element ID Extension fields may be similar to the corresponding Element ID and Element ID Extension fields in UORA Parameter Set element 1200 described above. The Length field value indicates the number of octets in the element 1600 excluding the Element ID and the Length fields.

The OCW range field may include an EOCWmin subfield, an EOCWmax subfield, a Multi-link Present subfield, and a Multi-link OBO Disallowed subfield. The EOCWmin and the EOCWmax subfields may be similar to the corresponding subfields of the OCW range field in UORA Parameter Set element 1200.

The Multi-link Present subfield in bit B7 of the OCW range field may indicate the presence of the optional Multi-link OCW Range field immediately following the OCW range field.

The Multi-link OBO Disallowed subfield in bit B8 of the OCW range field may indicate whether the use of m-OBO is allowed by the AP MLD for UORA access in any link. In some embodiments, an AP MLD using m-OBO enhanced ML UORA may set the Multi-link OBO Disallowed bit the ML UORA Parameter Set element to indicate whether RA-RUs indicated in any following trigger frames can be used by STA MLDs to decrement their respective m-OBO counters and eventually access the RA-RUs.

In some embodiments, the Multi-link OBO Disallowed subfield can be used to allow or disallow m-OBO enhanced ML UORA contention for the link where the ML UORA Parameter Set Element was received. In other embodiments, it can be a signal to allow or disallow ML UORA for all links enabled by the AP MLD.

The Multi-link OCW Range field sets the limits of a multi-link contention window (m-OCW) that the m-OBO is generated from. The Multi-link OCW Range field includes a Reserved subfield, an EOCWmin subfield, and an EOCWmax subfield.

Similar to the EOCWmin subfield of the OCW Range field, the EOCWmin subfield of the Multi-link OCW Range field indicates the value of a minimum parameter (mOCWmin) for an m-OCW internal variable maintained by STA MLD for initial TB PPDU transmission using m-OBO enhanced ML UORA. The mOCWmin parameter may be used by a STA MLD either for an initial transmission or following a successful TB PPDU transmission. The mOCWmin parameter may be derived as follows: mOCWmin=2^EOCWmin−1, where EOCWmin is the value in the EOCWmin subfield of the multi-link OCW Range field.

The EOCWmax subfield of the multi-link OCW Range field indicates the value of a maximum parameter (mOCWmax) for the m-OCW variable. The mOCWmax parameter may be used by a STA MLD for retransmission attempts of UORA. The mOCWmax parameter may be derived using mOCWmax=2^EOCWmax−1, where EOCWmax is the value in the EOCWmax subfield of the multi-link OCW Range field.

In another embodiment, the EOCWmin and EOCWmax may be determined by the STA MLD from an OCW Range field of a UORA Parameter Set Element contained in a management frame broadcast by the AP MLD on any link. These management frame can be a beacon frame, a Probe Response frame, or an Association Response frame.

The Reserved subfield can be used for signaling future features related to UORA operation and may be set to 0.

In an embodiment, the m-OCW variable is an integer in the range of mOCWmin to mOCWmax. A STA updates the mOCWmin and mOCWmax variables based on a received ML UORA Parameter Set element within an interval of time equal to one beacon interval after receiving the ML UORA Parameter Set element carried in a beacon, Probe Response, or (Re)Association Response frame transmitted by its associated AP MLD. A STA MLD that has not received an ML UORA Parameter Set element from the AP MLD with which it intends to communicate may use a default mOCWmin of 7 and a default mOCWmax of 31.

In an embodiment, an ML UORA Parameter Set element may be broadcast by the AP MLD to all STA MLDs that want to access the RA-RUs using m-OBO enhanced ML UORA.

In another embodiment, the AP MLD may send a QoS data frame, a QoS null frame, or a unicast management frame to a STA MLD containing EOCWmin and EOCWmax parameters that the STA MLD can use in setting its mOCW, instead of the EOCWmin and EOCWmax values included in an ML UORA Parameter Set Element received from a broadcast management frame. In the case of a QoS Data Frame or a QoS Null Frame, the EOCWmin and EOCWmax parameters can be a subfield in an HT Control Field of the QoS Data Frame or QoS Null Frame. In the case of a unicast management frame, the AP MLD may include the ML UORA Parameter Set Element containing the EOCWmin and EOCWmax parameters among other information elements that it may send the STA MLD.

It may be advantageous for the AP MLD to have the capability to dynamically allow or disallow STA MLDs to use an m-OBO for ML UORA. For example, when single link STAs are unable to consistently access the RA-RUs due to a high number of STA MLDs, the AP MLD may temporarily disable the use of m-OBO enhanced ML UORA until the AP MLD is able to determine and enforce a more appropriate value of OCW ranges (i.e. OCWmin and OCWmax) for single link STAs. To realize this, some embodiments may use signaling to disable m-OBO in a particular trigger frame (hereinafter referred to as Option 1). Some embodiments may also use signaling in a multi-cast management frame to disable m-OBO on all trigger frames on a specific link until another multi-cast management frame that enables the m-OBO back again (hereinafter referred to as Option 2).

Figure 17:
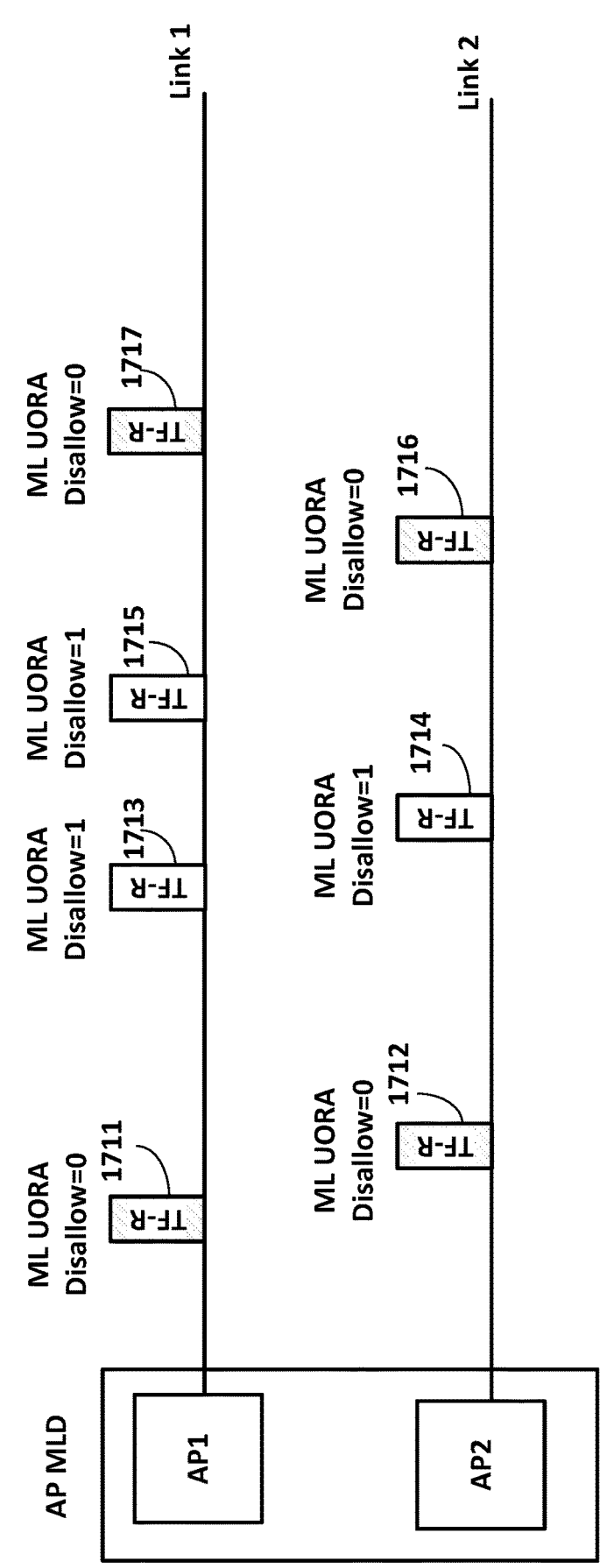
FIG. 17 illustrates an example of a first option of m-OBO enhanced ML UORA according to an embodiment.

FIG. 17 illustrates an example 1700 of Option 1 of m-OBO enhanced ML UORA according to an embodiment. According to example 1700, an AP MLD having a plurality of affiliated APs, AP1 and AP2, may transmit trigger frames to allow or disallow AP STAs to decrement their respective m-OBO counters based on RA-RUs indicated in TF-R frames. For example, as shown in FIG. 17, the AP MLD may send TF-Rs 1711, 1712, 1716, and 1717 that include a ML UORA Disallow indication set to 0 informing the MLD STAs receiving the TF-Rs that they may decrement their respective m-OBO counters using the number of RA-RUs indicated in the TF-Rs. An MLD STA can subsequently contend on an RA-RU indicated by a received TF-R when its m-OBO counter is decremented to zero.

The AP MLD may also send TF-Rs 1713, 1714, and 1715 that include a ML UORA Disallow indication set to 1 informing the MLD STAs receiving the TF-Rs that they may not decrement their respective m-OBO counters using the number of RA-RUs indicated in the TF-Rs. As such, an MLD STA may not contend on an RA-RU indicated by a received TF-R.

It is important to note that when receiving a TF-R that includes an ML UORA Disallow indication set to 1, an MLD STA receiving the TF-R may still access an RA-RU indicated by the TF-R by decrementing its OBO counter associated with the link on which the TF-R was received. However, as mentioned above, the MLD STA may not access the RA-RU based on decrementing the m-OBO counter.

Figure 18:
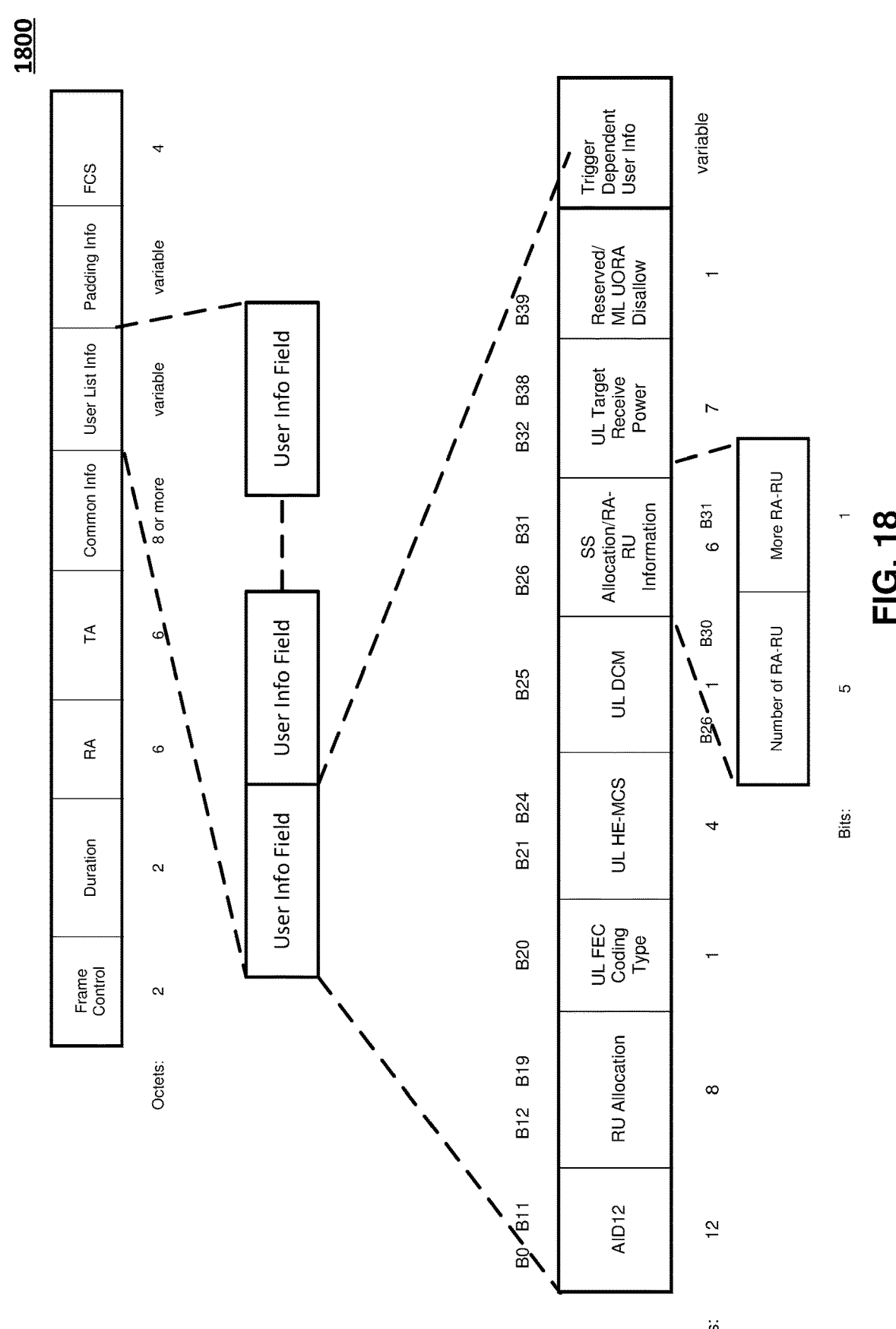
FIG. 18 illustrates an example trigger frame according to an embodiment.

FIG. 18 illustrates an example trigger frame 1800 according to an embodiment. Trigger frame 1800 may include signaling to allow or disallow reducing of the m-OBO counter based on indicated RA-RUs. As shown in FIG. 18, example trigger frame 1800 includes a Frame Control field, a Duration field, a receive address (RA) field, a transmit address (TA) field, a Common Info field, a User List Info field, a Padding Info field, and an FCS field. The Common Info field and the User List Info field make up the body of the trigger frame.

The Common Info field consists of parameters that are common to all users such as the Type of trigger frame and the PPDU bandwidth being triggered.

The User List Info field may include several User Info Fields which signal assignments of RUs to STAs. A User Info field may include an AID subfield, an RU Allocation subfield, a UL FEC Coding Type Subfield, a UL HE-MCS subfield, a UL DCM subfield, an SS Allocation/RA-RU Information subfield, a UL Target Receive Power subfield, a Reserved/ML UORA Disallow subfield, and a Trigger Dependent User info subfield.

The AID12 subfield identifies the STA to which the User Info field applies and to which an RU is being assigned. An AID value between 1 and 2007 indicates that the RU is being assigned to the STA whose last 12 bits of its AID matches the AID value. An AID value of 0 indicates that the indicated contiguous RUs are contiguous RA-RUs assigned for associated STAs. An AID12 value of 2045 indicates that the indicated contiguous RUs are contiguous RA-RUs assigned for unassociated STAs.

The RU allocation subfield identifies the size and location of the assigned RU relative to the whole PPDU frequency band. In an embodiment, when the AID12 subfield indicates that the RU is an RA-RU, B39 (of the Reserved/ML UORA Disallow subfield) may be used to signal allowing/disallowing m-OBO counter reduction based on the indicated number of RA-RUs. For example, B39 having a value equal to 1 may signal that ML UORA is disallowed on the RA-RU indicated by the User Info Field and that a STA MLD may not decrement its m-OBO counter based on the indicated number of RA-RUs. Otherwise, when B39 is equal to 0, ML UORA may be allowed and the STA MLD may decrement its m-OBO counter based on the indicated number of RA-RUs for ML UORA contention.

In an embodiment, when the AID12 subfield indicates that the RU is an RA-RU, B26 to B31 of the User Info Field signal an RA-RU information subfield which includes 2 further subfields: Number of RA-RU and More RA-RU. The Number of RA-RU subfield indicates the number of contiguous RUs allocated for UORA. The value of the Number of RA-RU subfield is equal to the number of contiguous RA-RUs minus 1. The More RA-RU subfield is set to 1 to indicate that RA-RUs of the type indicated by the AID12 subfield in the User Info field are allocated in subsequent Trigger frames that are sent until the end of a service period in which the trigger frame carrying the More RA-RU subfield set to 1 is sent. Otherwise, the subfield is set to 0.

Figure 19:
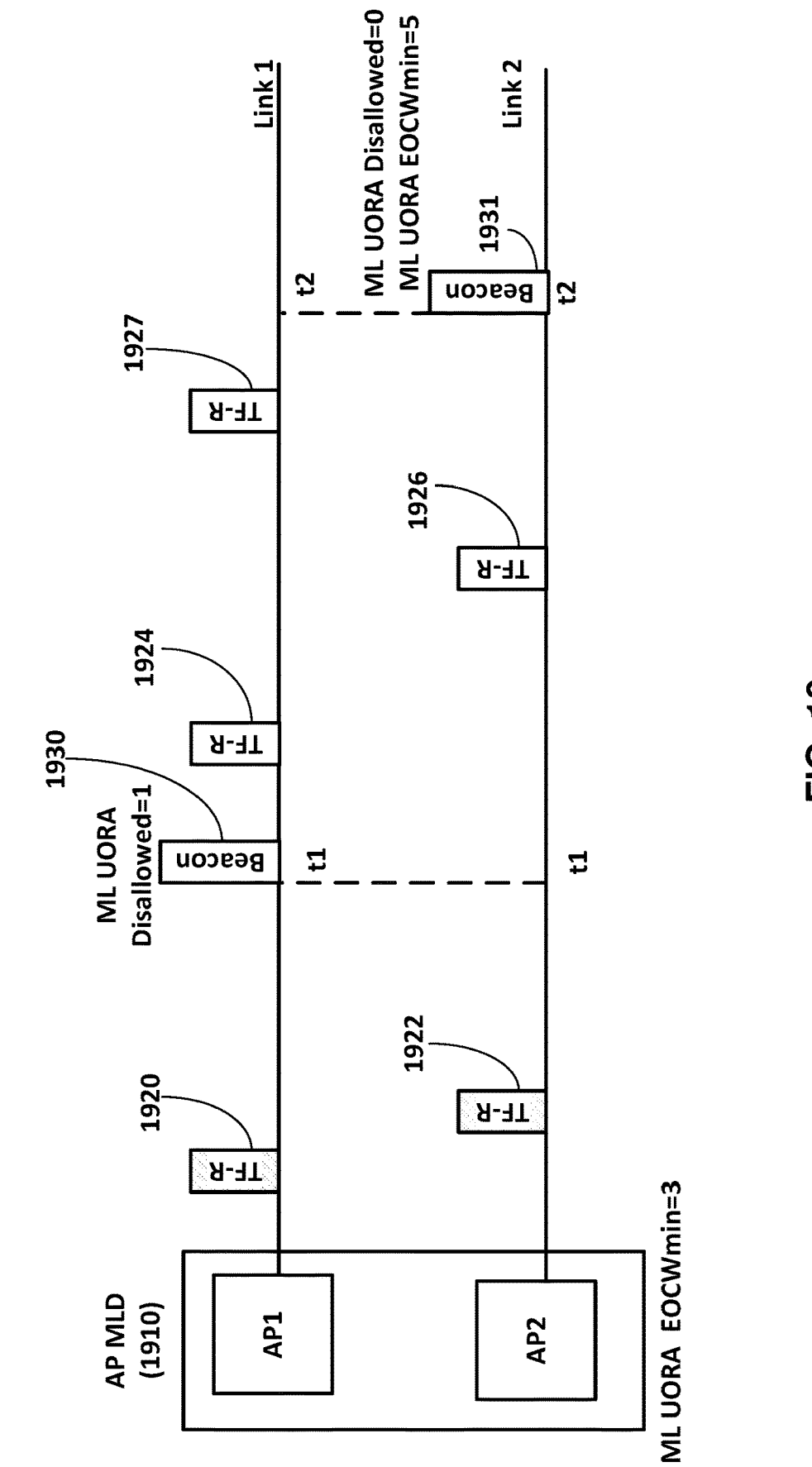
FIG. 19 illustrates a second option of m-OBO enhanced ML UORA operation according to an embodiment.

FIG. 19 illustrates an example 1900 of Option 2 of m-OBO enhanced ML UORA according to an embodiment. As shown in FIG. 19, example 1900 includes an AP MLD 1910 having two affiliated APs, AP1 and AP2. AP1 and AP2 may communicate on a first (link 1) and a second link (link 2) respectively with one or more STA MLDs and one or more non-MLD STAs (not shown in FIG. 19).

In example 1900, it is assumed that m-OBO enhanced ML UORA is enabled on both link 1 and link 2 when the AP MLD 1910 transmits two TF-Rs 1920 and 1922. Based on transmitted TB PPDU frames (not shown in the figure) in response to the TF-Rs 1920, 1922, the AP MLD 1910 may detect a low success probability from non MLD STAs on either link1 and link2. This may be detected by the AP MLD for example, by comparing the ratio per link of successful UORA transmissions coming from STA MLDs and non-MLD STAs versus the ratio of the number of STA MLDs and non-MLD STAs that are active assuming that they have similar buffered traffic.

As shown in example 1900, to quickly give non-MLD STAs better success probability when accessing RA-RUs, the AP MLD 1910 may transmit a beacon management frame 1930 with a ML UORA Disallow indication set to 1 at a time t1. In an embodiment, the signaling can be done using a Multi-link OBO Disallow subfield set to 1 as in the example ML UORA Parameter Set element 1600. Subsequently, with m-OBO enhanced ML UORA disabled, the AP MLD 1910 may transmit TF-Rs 1924, 1926, and 1927. During this time, STA MLDs are only able to access RA-RUs by decrementing their single link OBO counters. This allows non-MLD STAs to access RA-RUs with a similar success probability as a STA MLD until the AP MLD is able to enforce more appropriate values for the EOCWmin and EOCWmax parameters in both the UORA Parameter Set and the ML UORA Parameter Set elements.

When AP MLD 1910 is able to determine an appropriate value of EOCWmin and EOCWmax for both the UORA Parameter Set and the ML UORA Parameter Set elements (e.g., the non MLD STAs no longer need the protection provided by disallowing m-OBO enhanced ML UORA), AP MLD 1910 may transmit a beacon frame 1931 with the ML UORA Disallowed indication set to 0 at a time t2. The AP MLD may also indicate updated values of EOCWmin and EOCWmax in the beacon frame 1931 for either the UORA Parameter Set element or the ML UORA Parameter Set element. In the example 1900, the AP MLD 1910 increases the EOCWmin parameter of the ML UORA Parameter Set element from 3 to 5 while keeping the value of the EOCWmax unchanged. In another embodiment, instead of a beacon frame, a Probe Response frame or an Association Response frame may also be used.

In an embodiment, a STA MLD with a non-default TID-To-Link mapping may decrement its m-OBO counter to zero and gain access to an RA-RU on a link where it does not have any valid PPDU to send based on its TID-To-Link mapping. For example, the STA MLD may gain access to an RA-RU on a link without having PPDUs with TIDs mapped to the link. In such a case, if the STA MLD has PPDUs with other TIDs (i.e., TIDs not mapped to the link where it gained access to the RA-RU), the STA MLD may transmit BSRs of those TIDs on the link by aggregating one or more QoS Null frames.

Figure 20:
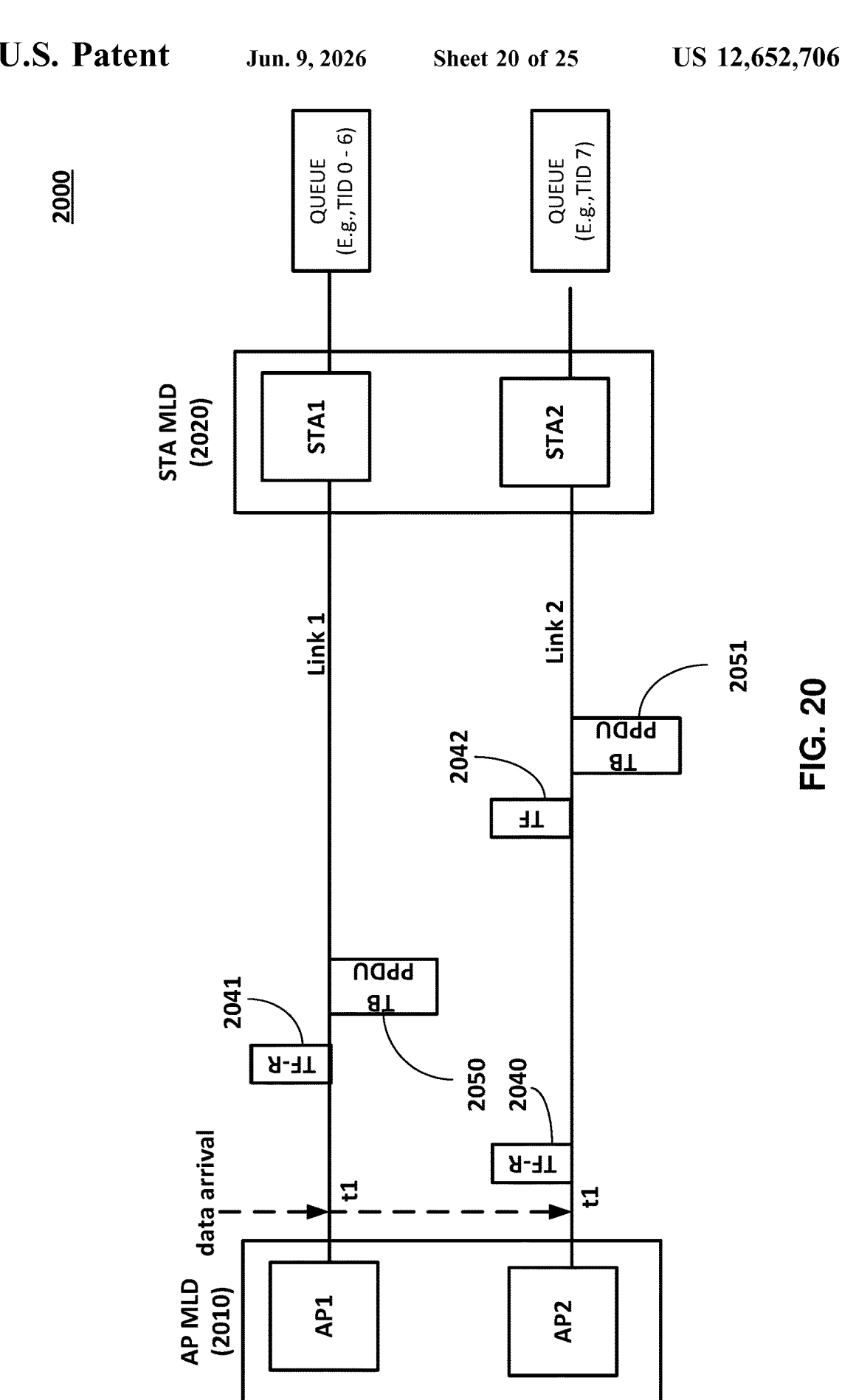
FIG. 20 illustrates another example operation of m-OBO enhanced ML UORA according to an embodiment.

FIG. 20 is an example 2000 that illustrates another example operation of m-OBO enhanced ML UORA according to an embodiment. As shown in FIG. 20, example 2000 includes an AP MLD 2010 and a STA MLD 2020. AP MLD 2010 has 2 affiliated APs, AP1 and AP2, and STA MLD 2020 has 2 affiliated STAs, STA1 and STA2. It is assumed that STA MLD 2020 has an established TID-to-Link mapping, in which TIDs 0 to 6 are mapped to link 1 and TID 7 is mapped to link 2.

In example 2000, data arrival at a time t1 from TIDs 6 and 7 cause STA MLD 2020 to contend for RA-RUs indicated by a TF-R 2040 transmitted on link 2. In this example, it is assumed that the m-OBO counter of STA MLD 2020 decrements to a non-zero after reception of TF-R 2040 sent in link 2. As such, STA MLD 2020 may not access RA-RUs indicated in TF-R 2040. Subsequently, after reception of a TF-R 2041 on link 1, the m-OBO counter decrements to zero. STA MLD 2020 may thus access RA-RUs indicated in TF-R 2041. In an embodiment, STA MLD 2020 may transmit a TB PPDU 2050 including a QoS data frame for TID 6 mapped to link 1. Additionally, STA MLD 2020 may include in TB PPDU 2050 a QoS null frame with a BSR for TID 7 (which is not mapped to link 1).

In an embodiment, with the BSR information of TID 7 sent using a ML UORA obtained TXOP, the AP MLD 2010 may allocate an RU on link 2 to allow STA MLD 2020 to transmit frames for TID 7. As shown in FIG. 20, AP MLD 2010 may send a basic trigger frame 2042 on link 2 in response to which STA MLD 2020 may transmit a TB PPDU 2051 containing QoS data frames for TID 7.

In an embodiment, an AP MLD that determines that the collision probability of STA MLDs accessing RA-RUs using ML UORA exceeds a device specific threshold can send a management frame with an updated ML UORA Parameter Set element. Alternatively, the AP MLD can disallow ML UORA for a link or allow ML UORA for a link using the signaling in ML UORA Parameter Set element 1600.

Figure 21:
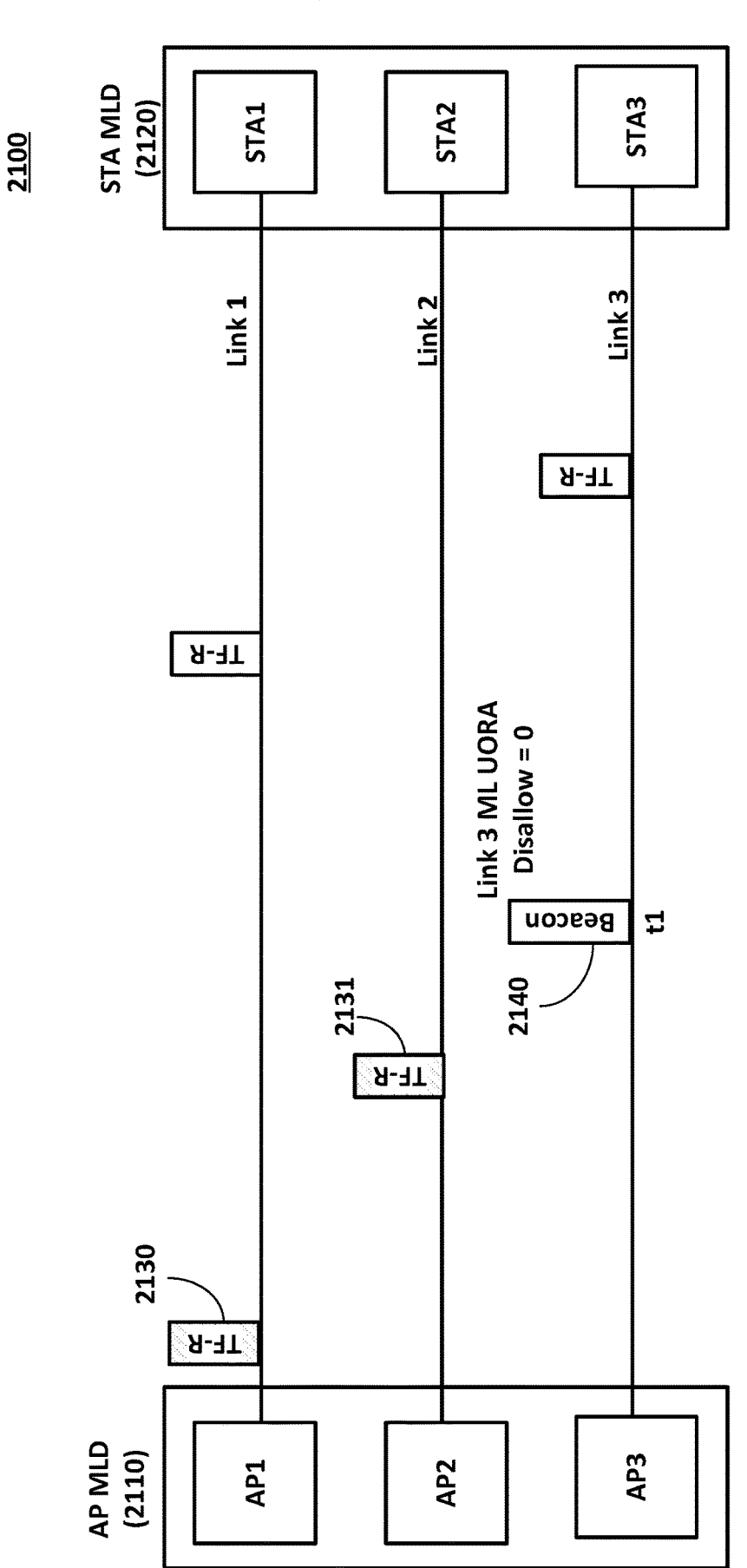
FIG. 21 is an example that illustrates enabling m-OBO enhanced ML UORA for a link based on a threshold of low success probability.

FIG. 21 is an example 2100 that illustrates allowing m-OBO enhanced ML UORA for a link based on a threshold of low success probability. As shown in FIG. 21, example 2100 includes an AP MLD 2110 and a STA MLD 2120. AP MLD 2110 may have a plurality of affiliated APs, AP1, AP2 and AP3, and STA MLD 2120 may have affiliated STAs, STA1, STA2 and STA3. AP1, AP2, and AP3 may communicate respectively on a first link (link 1), a second link (link 2), and a third link (link 3) with STA1, STA2, and STA3, respectively. STA MLD 2120 may implement m-OBO enhanced ML UORA as described above.

In an example, it is assumed that m-OBO enhanced ML UORA is active only for link 1 and link 2 initially. In an embodiment, the AP MLD 2110 may enable m-OBO enhanced ML UORA on links 1 and 2 by sending a management frame with the ML UORA Parameter Set element 1600 on links 1 and 2. Further, the AP MLD 2110 may disable m-OBO enhanced ML UORA on link 3 by sending a management frame with the ML UORA Parameter Set element 1600 on link 3 with a Multi-link OBO Disallowed indication set to 1. In an example, AP MLD 2110 transmits TF-Rs 2130 and 2131 on link 1 and link 2 respectively. Based on TF-Rs 2130 and 2131, the AP MLD 2110 may detect a collision probability that is greater than a device specific threshold of AP MLD 2110 for the RA-RUs indicated by TF-Rs 2130 and 2131. In response, the AP MLD 2110 may enable ML UORA on link 3. This allows STA MLD 2120 to access RA-RUs on link 3. In an embodiment, the AP MLD 2110 may enable m-OBO enhanced ML UORA on link 3 by transmitting a beacon frame 2140 on link 3 at a time t1. The beacon frame 2140 may include an ML UORA Parameter Set element with the ML UORA Disallow indication set to 0. In a following time period after t1, m-OBO enhanced ML UORA transmissions may be sent on link 3 (in addition to links 1 and 2), resulting in a decrease in collision probability on all links.

In some embodiments of m-OBO enhanced ML UORA, an AP MLD or an affiliated AP thereof may inform an associated STA MLD or an affiliated STA thereof whether the AP MLD supports m-OBO enhanced ML UORA using an information element that may be included in a beacon frame, a Probe Response frame, or an Association Response frame transmitted to the STA MLD or its affiliated STA. A STA MLD or an affiliated STA thereof may inform an AP MLD or an affiliated AP thereof whether the STA MLD supports ML UORA using an information element that may be included in a Probe Request frame or an Association Request frame transmitted to the AP MLD or its affiliated AP.

Figure 22:
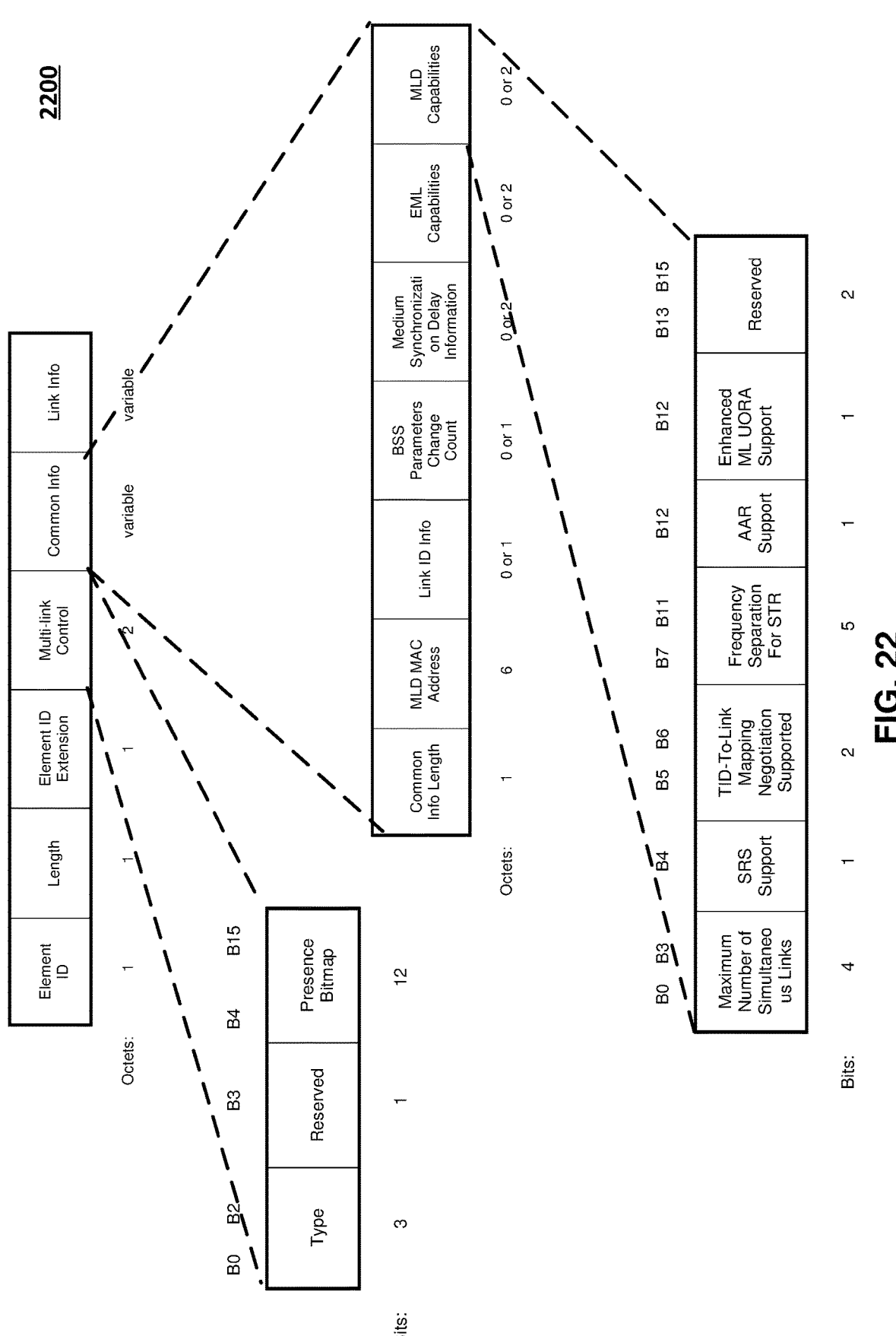
FIG. 22 illustrates an example of a multi-link element which may be used by an AP MLD or a STA MLD to signal m-OBO enhanced ML UORA capability.

FIG. 22 illustrates an example multi-link element 2200 which may be used by an AP MLD or a STA MLD to signal m-OBO enhanced ML UORA capability. The AP MLD may include the multi-link element in management frames that the AP MLD transmits such as beacon frames or Association Response frames. The STA MLD may include the multi-link element in Association Request frames that the STA MLD sends during a multi-link setup as described in FIG. 9 above.

As shown in FIG. 22, multi-link element 2200 may include an Element ID field, a Length field, an Element ID Extension Field, a Multi-Link Control field, a Common Info Field, and a Link Info field.

The element ID and Element ID Extension field values may be set to 255 and 107 respectively to uniquely identify the multi-link element from other information elements sent by the AP in management frames.

The Length field indicates the number of octets in the element excluding the Element ID and Length fields.

The Multi-link control field may include a Type of the multi-link element, a Presence Bitmap for the subfields that are present in the Common Info Field, and a Reserved Bit for future use. The multi-link element may have one of three types: Basic, Probe Request, and Reconfiguration. A Basic multi-link element may be used to carry information of an MLD and its affiliated STAs during multi-link discovery and multi-link setup. A Probe Request multi-link element may be used to request that an AP affiliated with an AP MLD provide information regarding other APs affiliated with the same AP MLD.

In example multi-link element 2200, it is assumed that the Basic multi-link element type is used. As such, in the Common Info field, a Common Info Length subfield indicates the number of octets in the Common Info field. The MLD MAC Address subfield specifies the MAC Address of the MLD with which the STA transmitting the basic multi-link element is affiliated. The Link ID Info field indicates the link identifier of the AP that is affiliated with the AP MLD described in the Basic multi-link element. The BSS Parameters Change Count subfield is one octet in length and carries an unsigned integer, initialized to 0. The value carried in the subfield is incremented when a critical update occurs to the operational parameters for the AP that is affiliated with the AP MLD described in the basic multi-link element. The Medium Synchronization Delay Information informs STAs about Duration and Energy Detect Thresholds for a Medium Access Recovery Procedure. The Enhanced Medium EML Capabilities subfield contains information for the Enhanced Multi-link Single Radio (EMLSR) operation and Enhanced Multi-link Multiple Radio (EMLMR) operation. The MLD Capabilities subfield signals different capability information supported by the AP or STA MLD where the multi-link element is transmitted. These include the Maximum Number of Simultaneous Links, Single Response Scheduling (SRS) Support, TID-To-Link Mapping Negotiation Support, Frequency Separation for Simultaneous Transmit and Receive (STR) Operation, AP Assistance Request (AAR) support, and Enhanced ML UORA Support. The MLD Capabilities subfield includes two Reserve bits that remain for future use.

In an embodiment, the Enhanced ML UORA Support bit in the MLD Capabilities subfield may be set to 1 in a beacon frame or an Association Response frame sent by an AP MLD to inform a STA MLD of m-OBO Enhanced ML UORA support by the AP MLD. In an embodiment, a STA MLD may set the enhanced ML UORA Support bit to 1 in an Association Request frame to inform the AP MLD that the STA MLD supports m-OBO enhanced ML UORA.

Figure 23:
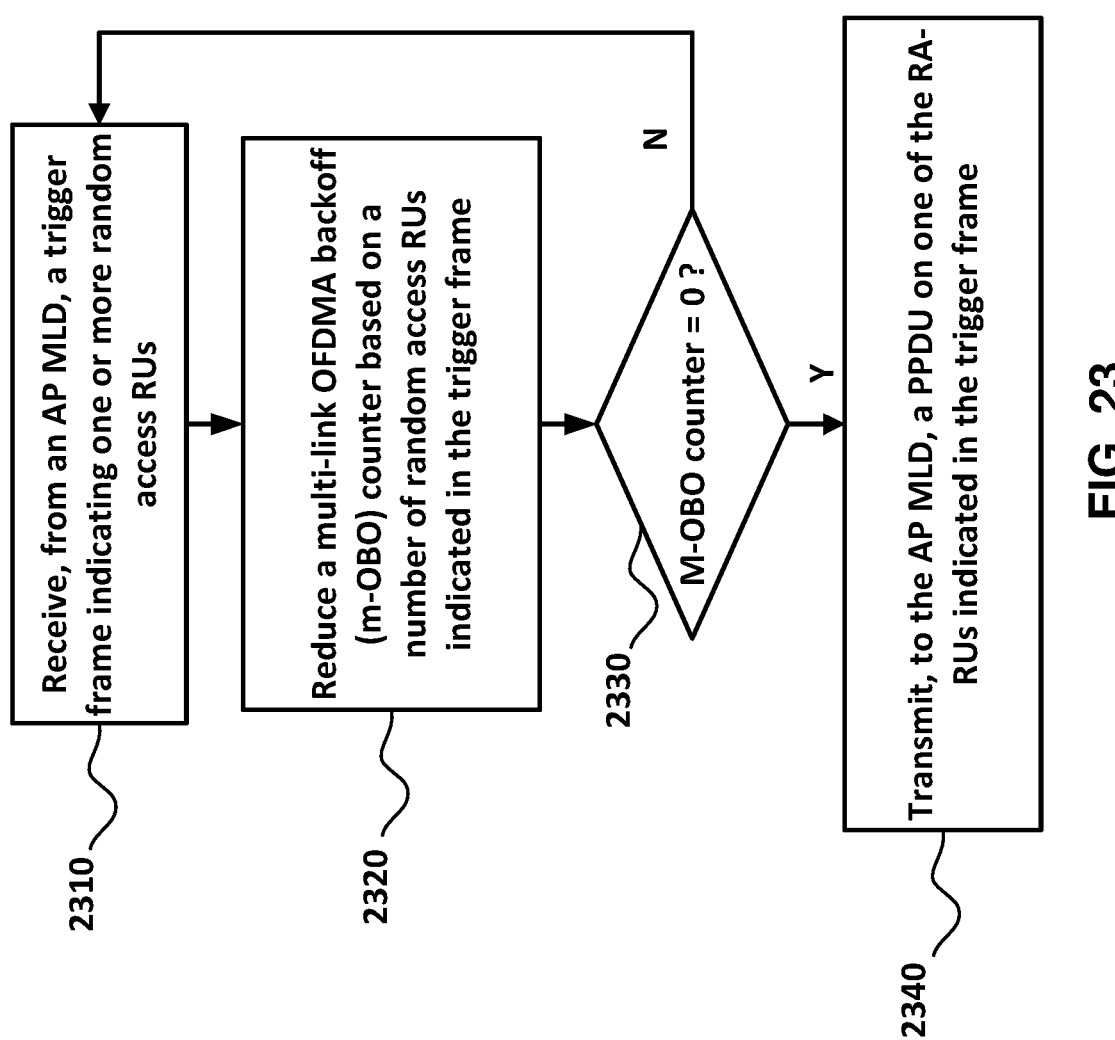
FIG. 23 illustrates an example process according to an embodiment of the present disclosure.

FIG. 23 illustrates an example process 2300 according to an embodiment of the present disclosure. Example process 2300 may be performed by a STA MLD. The STA MLD may support m-OBO enhanced ML UORA and may be associated with an AP MLD that also supports m-OBO enhanced ML UORA.

In an embodiment, the STA MLD may transmit to the AP MLD an Association Request frame including a first capability element and may receive, in response, an Association Response frame comprising a second capability element. The first capability element can be made up of one or more bits indicating whether or not the STA MLD supports m-OBO enhanced ML UORA on enabled links of the AP MLD. Likewise, the second capability element can be made of one or more bits indicating whether or not the AP MLD supports m-OBO enhanced ML UORA.

In an embodiment, the STA MLD may generate and maintain an m-OBO counter for use with m-OBO enhanced ML UORA. Such an m-OBO may be generated randomly from 0 up to an integer value mOCW where mOCW range from mOCWmin up to mOCWmax. In an embodiment, the values of mOCWmin and mOCWmax may be derived based on a UORA parameter set element associated with any enabled link of the AP MLD. In another embodiment, the values of mOCWmin and mOCWmax may be derived based on an ML UORA parameter set element announced by the AP MLD. Such ML UORA parameter set element may be present in the association response frames sent by AP MLD that contains the second capability element. In yet another embodiment, the STA MLD may receive a QoS Data Frame, a QoS Null Frame, or a unicast management frame indicating an ML UORA parameter set element which it uses to set the mOCW when generating its m-OBO.

In an embodiment, the STA MLD may be communicatively coupled to the AP MLD through a plurality of links. m-OBO enhanced ML UORA may be enabled for the plurality of links. For example, the STA MLD may have received a ML UORA Parameter Set element from the AP MLD indicating that m-OBO enhanced ML UORA is allowed on the plurality of links between the AP MLD and the STA MLD.

As shown in FIG. 23, process 2300 may include, in step 2310, receiving by the STA MLD a trigger frame indicating one or more RA-RUs.

In step 2320, process 2300 may include decrementing the m-OBO counter based on a number of RA-RUs indicated in the trigger frame.

In an embodiment, the trigger frame may include an indication enabling or disabling the reducing of the m-OBO counter based on the number of RA-RUs indicated in trigger frames. In another embodiment, the STA MLD may receive a management frame enabling or disabling the reducing of the m-OBO based on the number of RA-RUs indicated in trigger frames for any received trigger frames. In such an embodiment, the AP MLD may include an updated UORA parameter set or a ML UORA parameter set for use when the STA MLDs are again able to use the m-OBO enhanced ML UORA. The management frame may be a beacon frame, a Probe Response frame or an Association Response frame.

In step 2330, process 2300 may include determining whether the m-OBO counter, as decremented in step 2320, is less than or equal to zero. If the answer is no, process 2300 returns to step 2310, in which another trigger frame indicating RA-RUs may be received. Otherwise, process 2300 transitions to step 2340, which includes transmitting a PPDU on one of the RA-RUs indicated by the trigger frame.

In an embodiment, the PPDU may be an EHT TB-PPDU or an HE TB-PPDU. In another embodiment, the PPDU may be transmitted using OFDMA or multi-user Multiple Input Multiple Output (MU-MIMO). In some embodiments, the PPDU is transmitted after a SIFS duration from reception of the trigger frame. In addition, the PPDU may be transmitted on the same link on which the trigger frame is received.

In an embodiment, the trigger frame may signal whether or not another trigger frame with RA-RUs is scheduled on a different link than the link on which the current trigger frame is received. Furthermore, the trigger frame may include a link indication to identify the link on which the scheduled trigger frame will be transmitted.

In an embodiment, the STA MLD may be associated with a plurality of TIDs, each of the TIDs being mapped to one or more links of the plurality of links. In such an embodiment, the PPDUs transmitted by the STA MLD on one link may include a BSR corresponding to a TID of the plurality of TIDs which is not mapped to the link on which the PPDU is transmitted. The BSRs may be transmitted in QoS Null Data Frames or QoS Data Frames that make up the PPDU.

FIG. 24 illustrates an example process 2400 according to an embodiment of the present disclosure. Example process 2400 may be performed by an AP MLD. The AP MLD may support m-OBO enhanced ML UORA. In an embodiment, one or more STA MLDs may be associated with the AP MLD and one or more of these STA MLDs may support m-OBO enhanced ML UORA.

As shown in FIG. 24, process 2400 may include, in step 2410, transmitting a management frame enabling m-OBO enhanced ML UORA for a plurality of links. The management frame may optionally include an ML UORA Parameter Set element for use by STA MLDs supporting m-OBO enhanced ML UORA to initialize and update their m-OBO counters. In an embodiment, the ML UORA Parameter Set element may contain parameters to derive a value of mOCWmin and mOCWmax that are used by the STA MLDs to generate and update their m-OBO counters. For example, the ML UORA Parameter Set element may be similar to element 1600 described with reference to FIG. 16 above.

In an embodiment, the AP MLD may transmit a QoS Data Frame, a QoS Null Frame, or a unicast management frame indicating an ML UORA parameter set element to a STA MLD that supports m-OBO enhanced ML UORA for use by the STA MLD to set the mOCW when generating its m-OBO counter.

In an embodiment, the AP MLD may determine that a number of STA MLDs using m-OBO enhanced ML UORA exceeds a threshold and may transmit a second management frame indicating an updated set of ML UORA Parameter Set. The second management frame may include a beacon frame, a probe response frame, or an association response frame.

In step 2420, process 2400 may include transmitting on a first link of the plurality of links, a first trigger frame indicating one or more RA-RUs. STA MLDs can use the indicated RA-RUs to decrement their m-OBO counters to access the indicated RA-RUs. In an embodiment, the AP MLD may transmit on a second link of the plurality of links, a second trigger frame indicating RA-RUs but also including indications disallowing m-OBO enhanced ML UORA. In such an embodiment, the RA-RU can only be used by a STA MLD by decrementing its OBO counter (single link) on the second link until it reduces to zero.

In an embodiment, the AP MLD may transmit on a link of the plurality of links, a trigger frame signaling the presence of a scheduled trigger frame indicating random access RUs that are scheduled on a different link than the link on which the trigger frame is transmitted. In another embodiment, the trigger frame may include a link indication of a link of the plurality of links on which the scheduled trigger frame will be transmitted.

In step 2430, process 2400 may include receiving a PPDU on one of the RA-RUs indicated by the trigger frame from one of the STA MLDs.

In step 2440, process 2400 may include decoding, based on the received PPDU, a MAC Address of a STA MLD that transmitted the PPDU in step 2430.

In step 2450, process 2400 may include transmitting an acknowledgment frame to the STA MLD that transmitted the PPDU in step 2430 using the MAC Address decoded in step 2440.

In an embodiment, the acknowledgment frame in step 2450 may include an ACK, a single TID Block ACK, a multi-TID Block ACK, a multi-STA ACK, a multi-STA Block ACK, or a multi-STA multi-TID Block ACK.

Figure 25:
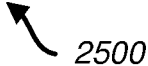
FIG. 25 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2500 is shown in FIG. 25.

Computer system 2500 includes one or more processors, such as processor 2504. Processor 2504 may be, for example, a special purpose processor, general purpose processor, microprocessor, or digital signal processor. Processor 2504 may be connected to a communication infrastructure 2502 (for example, a bus or network). Computer system 2500 may also include a main memory 2506, such as random access memory (RAM), and may also include a secondary memory 2508.

Secondary memory 2508 may include, for example, a hard disk drive 2510 and/or a removable storage drive 2512, representing a magnetic tape drive, an optical disk drive, or the like. Removable storage drive 2512 may read from and/or write to a removable storage unit 2516 in a well-known manner. Removable storage unit 2516 represents a magnetic tape, optical disk, or the like, which is read by and written to by removable storage drive 2512. As will be appreciated by persons skilled in the relevant art(s), removable storage unit 2516 includes a computer usable storage medium having stored therein computer software and/or data.

In alternative implementations, secondary memory 2508 may include other similar means for allowing computer programs or other instructions to be loaded into computer system 2500. Such means may include, for example, a removable storage unit 2518 and an interface 2514. Examples of such means may include a program cartridge and cartridge interface (such as that found in video game devices), a removable memory chip (such as an EPROM or PROM) and associated socket, a thumb drive and USB port, and other removable storage units 2518 and interfaces 2514 which allow software and data to be transferred from removable storage unit 2518 to computer system 2500.

Computer system 2500 may also include a communications interface 2520. Communications interface 2520 allows software and data to be transferred between computer system 2500 and external devices. Examples of communications interface 2520 may include a modem, a network interface (such as an Ethernet card), a communications port, etc. Software and data transferred via communications interface 2520 are in the form of signals which may be electronic, electromagnetic, optical, or other signals capable of being received by communications interface 2520. These signals are provided to communications interface 2520 via a communications path 2522. Communications path 2522 carries signals and may be implemented using wire or cable, fiber optics, a phone line, a cellular phone link, an RF link, and other communications channels.

As used herein, the terms "computer program medium" and "computer readable medium" are used to refer to tangible (non-transitory) storage media, such as removable storage units 2516 and 2518 or a hard disk installed in hard disk drive 2510. These computer program products are means for providing software to computer system 2500. Computer programs (also called computer control logic) may be stored in main memory 2506 and/or secondary memory 2508. Computer programs may also be received via communications interface 2520. Such computer programs, when executed, enable the computer system 2500 to implement the present disclosure as discussed herein. In particular, the computer programs, when executed, enable processor 2504 to implement the processes of the present disclosure, such as any of the methods described herein. Accordingly, such computer programs represent controllers of the computer system 2500.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the art.

What is claimed is:

1. An access point (AP) multi-link device (MLD) comprising:
   one or more processors; and
   memory storing instructions that, when executed by the one or more processors, cause the AP MLD to:
   transmit, on a first link of a plurality of links, a first trigger frame indicating one or more random access resource units (RA-RUs);
   receive a physical layer protocol data unit (PPDU) on one of the RA-RUs indicated by the first trigger frame;
   decode, based on the received PPDU, a medium access control (MAC) address of a station (STA) multi-link device (MLD) that transmitted the PPDU;
   transmit an acknowledgement frame to the STA MLD; and
   transmit, on a second link of the plurality of links, a second trigger frame indicating RA-RUs.

2. The AP MLD of claim 1, wherein the instructions, when executed by the one or more processors, further cause the AP MLD to transmit a first management frame, wherein the first management frame comprises a set of random access parameters for use on multiple links of the plurality of links.

3. The AP MLD of claim 2, wherein the set of random access parameters comprise:
   a minimum orthogonal frequency division multiple access (OFDMA) contention window (mOCWmin) specifying a minimum value of an OFDMA contention window (mOCW) of the STA MLD; and
   a maximum OFDMA contention window (mOCWmax) specifying a maximum value of the OFDMA contention window of the STA MLD.

4. The AP MLD of claim 2, wherein the instructions, when executed by the one or more processors, further cause the AP MLD to transmit a Quality of Service (QoS) data frame, a QoS null frame, or a unicast management frame to at least one STA MLD indicating a change of the set of random access parameters.

5. The AP MLD of claim 2, wherein the instructions, when executed by the one or more processors, further cause the AP MLD to:

determine that a number of STA MLDs using multi-link random access in the plurality of links exceeds a threshold; and transmit a second management frame indicating an updated set of random access parameters.

6. The AP MLD of claim 2, wherein the first management frame comprises a beacon frame, a probe response frame, or an association response frame.

7. The AP MLD of claim 1, wherein the acknowledgment frame comprises an ACK, a single traffic identifier (TID) block ACK, a multi-TID block ACK, a multi-STA ACK, a multi-STA block ACK, or a multi-STA multi-TID block ACK.

8. The AP MLD of claim 1, wherein the second trigger frame disallows multi-link random access on the RA-RUs indicated by the second trigger frame.

9. The AP MLD of claim 1, wherein the instructions, when executed by the one or more processors, further cause the AP MLD to transmit, on a third link of the plurality of links, a third trigger frame indicating at least one of:

presence of a scheduled trigger frame indicating RA-RUs, the scheduled trigger frame scheduled on a fourth link different than the third link on which the third trigger frame is transmitted; and the fourth link on which the scheduled trigger frame is scheduled.

10. A method comprising:

transmitting, on a first link of a plurality of links, a first trigger frame indicating one or more random access resource units (RA-RUs);

receiving a physical layer protocol data unit (PPDU) on one of the RA-RUs indicated by the first trigger frame;

decoding, based on the received PPDU, a medium access control (MAC) address of a station (STA) multi-link device (MLD) that transmitted the PPDU;

transmitting an acknowledgement frame to the STA MLD; and transmitting, on a second link of the plurality of links, a second trigger frame indicating RA-RUs.

11. The method of claim 10, further comprising transmitting a first management frame, wherein the first management frame comprises a set of random access parameters for use on multiple links of the plurality of links.

12. The method of claim 11, wherein the set of random access parameters comprise:

a minimum orthogonal frequency division multiple access (OFDMA) contention window (mOCWmin) specifying a minimum value of an OFDMA contention window (mOCW) of the STA MLD; and a maximum OFDMA contention window (mOCWmax) specifying a maximum value of the OFDMA contention window of the STA MLD.

13. The method of claim 11, further comprising transmitting a Quality of Service (QoS) data frame, a QoS null frame, or a unicast management frame to at least one STA MLD indicating a change of the set of random access parameters.

14. The method of claim 11, further comprising:

determining that a number of STA MLDs using multi-link random access in the plurality of links exceeds a threshold; and transmitting a second management frame indicating an updated set of random access parameters.

15. The method of claim 11, wherein the first management frame comprises a beacon frame, a probe response frame, or an association response frame.

16. The method of claim 10, wherein the acknowledgment frame comprises an ACK, a single traffic identifier (TID) block ACK, a multi-TID block ACK, a multi-STA ACK, a multi-STA block ACK, or a multi-STA multi-TID block ACK.

17. The method of claim 10, wherein the second trigger frame disallows multi-link random access on the RA-RUs indicated by the second trigger frame.

18. The method of claim 10, further comprising transmitting, on a third link of the plurality of links, a third trigger frame indicating at least one of:

presence of a scheduled trigger frame indicating RA-RUs, the scheduled trigger frame scheduled on a fourth link different than the third link on which the third trigger frame is transmitted; and the fourth link on which the scheduled trigger frame is scheduled.

19. A non-transitory computer-readable medium comprising instructions that, when executed by one or more processors, cause an access point (AP) multi-link device (MLD) to:

transmit, on a first link of a plurality of links, a first trigger frame indicating one or more random access resource units (RA-RUs);

receive a physical layer protocol data unit (PPDU) on one of the RA-RUs indicated by the first trigger frame;

decode, based on the received PPDU, a medium access control (MAC) address of a station (STA) multi-link device (MLD) that transmitted the PPDU;

transmit an acknowledgement frame to the STA MLD; and transmit, on a second link of the plurality of links, a second trigger frame indicating RA-RUs.

20. The non-transitory computer-readable medium of claim 19, wherein the instructions, when executed by the one or more processors, further cause the AP MLD to transmit a first management frame, and wherein the first management frame comprises a set of random access parameters for use on multiple links of the plurality of links.

* * * * *